US011321373B2

(12) United States Patent
Gupta et al.

(10) Patent No.: US 11,321,373 B2
(45) Date of Patent: *May 3, 2022

(54) NATURAL-LANGUAGE BASED INTELLIGENT ANALYTICS INTERFACE

(71) Applicant: Adobe Inc., San Jose, CA (US)

(72) Inventors: Prakhar Gupta, Bengaluru (IN); Iftikhar Ahamath Burhanuddin, Bangalore (IN); Harvineet Singh, Bengaluru (IN); Atanu Ranjan Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 16/698,383

(22) Filed: Nov. 27, 2019

(65) Prior Publication Data

US 2020/0097495 A1 Mar. 26, 2020

Related U.S. Application Data

(63) Continuation of application No. 15/808,498, filed on Nov. 9, 2017, now Pat. No. 10,546,003.

(51) Int. Cl.
*G06F 16/33* (2019.01)
*G06F 16/242* (2019.01)
(Continued)

(52) U.S. Cl.
CPC ........ *G06F 16/3344* (2019.01); *G06F 16/243* (2019.01); *G06F 16/3325* (2019.01); *G06F 16/3326* (2019.01); *G06F 16/3329* (2019.01); *G06F 40/30* (2020.01); *G10L 15/22* (2013.01); *H04L 51/02* (2013.01); *G10L 15/26* (2013.01);
(Continued)

(58) Field of Classification Search
CPC ............... G10L 15/22; G10L 2015/223; G10L 2015/228; G10L 15/26; G06F 16/243; G06F 16/3325; G06F 16/3326; G06F 16/3329; G06F 16/3344; G06F 40/30; H04L 51/02
See application file for complete search history.

(56) References Cited

U.S. PATENT DOCUMENTS 6,292,767 B1 * 9/2001 Jackson .................. G06F 40/30
704/9
6,598,018 B1 7/2003 Junqua
(Continued)

OTHER PUBLICATIONS

C. Cortes and V. Vapnik. Support-vector networks. Machine learning, 20(3): 273-297, 1995.
(Continued)

*Primary Examiner* — Eric Yen
(74) *Attorney, Agent, or Firm* — Keller Preece PLLC

(57) ABSTRACT

This disclosure covers methods, non-transitory computer readable media, and systems that use an intelligent analytics interface to process natural-language and other inputs to configure an analytics task for the system. The disclosed methods, non-transitory computer readable media, and systems provide the intelligent analytics interface to facilitate an exchange between the systems and a user to determine values for the analytics task. The methods, non-transitory computer readable media, and systems then use these values to execute an analytics task.

20 Claims, 9 Drawing Sheets

(51) Int. Cl.
*G06F 16/332* (2019.01)
*G10L 15/22* (2006.01)
*H04L 51/02* (2022.01)
*G06F 40/30* (2020.01)
*G10L 15/26* (2006.01)

(52) U.S. Cl.
CPC .. *G10L 2015/223* (2013.01); *G10L 2015/228* (2013.01)

(56) References Cited

U.S. PATENT DOCUMENTS

| | | |
|---|---|---|
| 7,092,928 B1 | 8/2006 | Elad et al. |
| 7,822,699 B2 | 10/2010 | Katariya et al. |
| 8,326,643 B1* | 12/2012 | Eshkenazi ............... G06Q 30/02 379/265.06 |
| 9,378,740 B1 | 6/2016 | Rosen et al. |
| 9,501,585 B1 | 11/2016 | Gautam et al. |
| 10,467,122 B1* | 11/2019 | Doyle .................. G06Q 20/207 |
| 2002/0161646 A1* | 10/2002 | Gailey ............... H04M 3/42204 704/E15.026 |
| 2006/0080101 A1* | 4/2006 | Chotimongkol ........ G06F 40/30 704/E15.026 |
| 2008/0319947 A1 | 12/2008 | Latzina et al. |
| 2009/0228818 A1* | 9/2009 | Hebard ................. G06F 40/106 715/768 |
| 2009/0287405 A1* | 11/2009 | Liu ........................ G01C 21/20 701/119 |
| 2010/0033036 A1* | 2/2010 | Ortt ......................... H02K 1/17 310/156.38 |
| 2011/0154209 A1 | 6/2011 | Fan et al. |
| 2013/0158980 A1 | 6/2013 | Landry et al. |
| 2014/0372427 A1 | 12/2014 | Lehmann et al. |
| 2015/0088499 A1* | 3/2015 | White ..................... H04L 67/42 715/728 |
| 2015/0142704 A1 | 5/2015 | London |
| 2015/0169284 A1* | 6/2015 | Quast .................. G06F 16/9535 704/275 |
| 2015/0179170 A1 | 6/2015 | Sarikaya et al. |
| 2015/0248644 A1 | 9/2015 | Zenger et al. |
| 2016/0098996 A1* | 4/2016 | Ding ........................ G10L 17/22 704/232 |
| 2016/0307210 A1* | 10/2016 | Agarwal .......... G06Q 10/06316 |
| 2016/0379148 A1 | 12/2016 | Brown et al. |
| 2017/0039281 A1 | 2/2017 | Venkata et al. |
| 2017/0084295 A1* | 3/2017 | Tsiartas ................... G10L 17/08 |
| 2017/0097986 A1 | 4/2017 | Zhu et al. |
| 2017/0270915 A1* | 9/2017 | Bordewieck ...... G06F 16/90332 |
| 2017/0287478 A1 | 10/2017 | Schulz et al. |
| 2017/0300712 A1 | 10/2017 | Timmerman et al. |
| 2017/0330556 A1 | 11/2017 | Fatemi Booshehri et al. |
| 2017/0352347 A1 | 12/2017 | Sharma et al. |
| 2018/0061401 A1 | 3/2018 | Sarikaya et al. |
| 2018/0075847 A1 | 3/2018 | Lee et al. |
| 2018/0157638 A1 | 6/2018 | Li et al. |
| 2018/0232110 A1 | 8/2018 | Cheung et al. |
| 2018/0233141 A1 | 8/2018 | Solomon et al. |
| 2018/0307504 A1 | 10/2018 | Aggarwal et al. |
| 2018/0338041 A1 | 11/2018 | McGann et al. |
| 2018/0349474 A1 | 12/2018 | Smith et al. |
| 2019/0012371 A1 | 1/2019 | Campbell et al. |
| 2019/0138648 A1 | 5/2019 | Gupta et al. |

OTHER PUBLICATIONS

E. den Os, L. Boves, S. Rossignol, L. ten Bosch, and L. Vuurpijl. Conversational agent or direct manipulation in human{system interaction. Speech Communication, 47(1):194-207, 2005.

K. Dhamdhere, K. S. McCurley, R. Nahmias, M. Sundararajan, and Q. Yan. Analyza: Exploring data with conversation. In Proceedings of the 22nd International Conference on Intelligent User Interfaces, pp. 493-504. ACM, 2017.

T. Gao, M. Dontcheva, E. Adar, Z. Liu, and K. G. Karahalios. Datatone: Managing ambiguity in natural language interfaces for data visualization. In Proceedings of the 28th Annual ACM Symposium on User Interface Software & Technology, pp. 489-500. ACM, 2015.

J. Hirschberg and C. D. Manning. Advances in natural language processing. Science, 349(6245): 261-266, 2015.

S. Kandel, A. Paepcke, J. M. Hellerstein, and J. Heer. Enterprise data analysis and visualization: An interview study. IEEE Transactions on Visualization and Computer Graphics, 18(12): 2917-2926, 2012.

J. Lafferty, A. McCallum, F. Pereira, et al. Conditional random fields: Probabilistic models for segmenting and labeling sequence data. In Proceedings of the eighteenth international conference on machine learning, ICML, vol. 1, pp. 282-289, 2001.

A. McCallum, D. Freitag, and F. C. Pereira. Maximum entropy markov models for information extraction and segmentation. In Icml, vol. 17, pp. 591-598, 2000.

V. Setlur, S. E. Battersby, M. Tory, R. Gossweiler, and A. X. Chang. Eviza: A natural language interface for visual analysis. In Proceedings of the 29th Annual Symposium on User Interface Software and Technology, pp. 365-377. ACM, 2016.

U.S. Appl. No. 15/808,498, Apr. 12, 2019, Office Action.
U.S. Appl. No. 15/808,498, Sep. 11, 2019, Notice of Allowance.

* cited by examiner

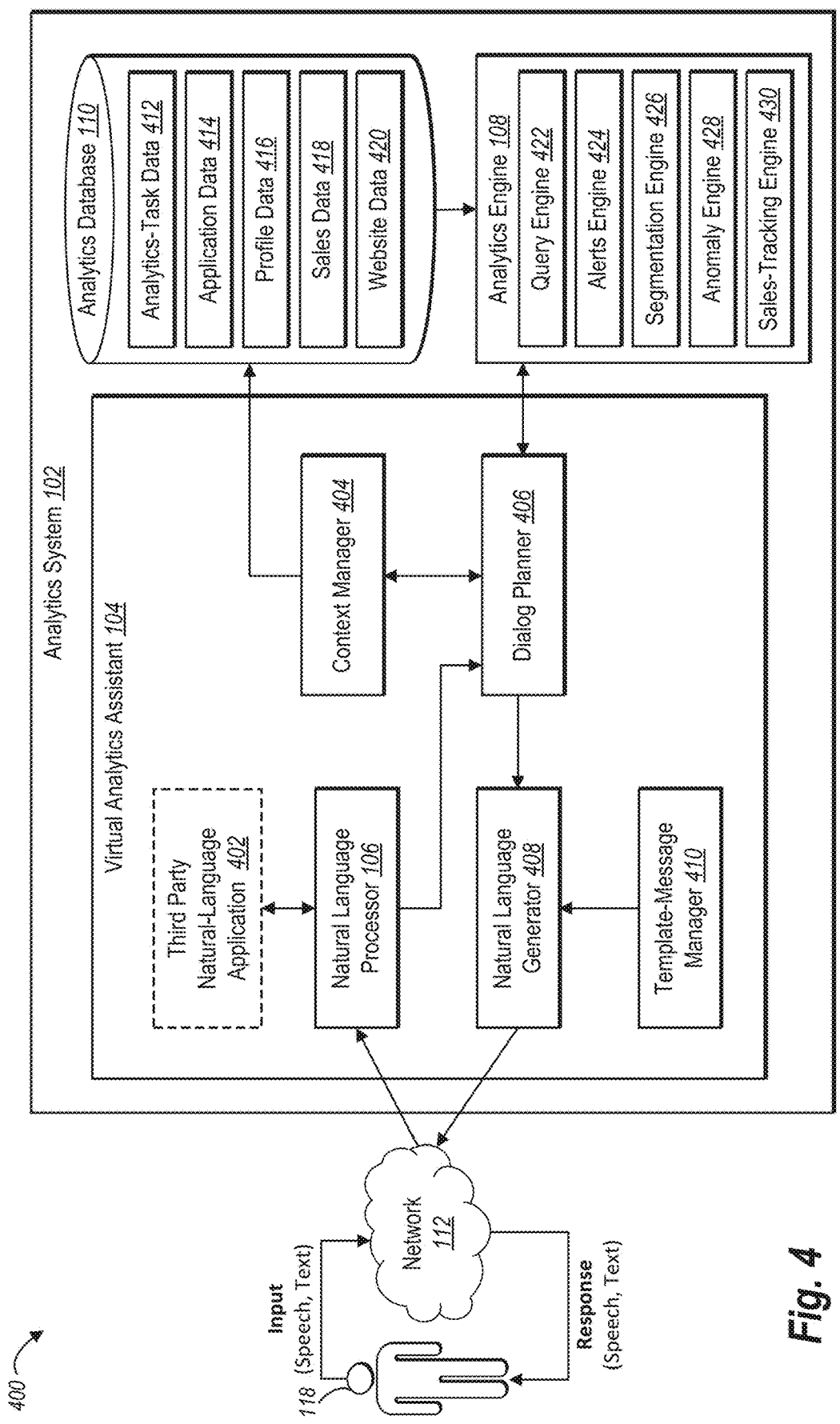

NATURAL-LANGUAGE BASED INTELLIGENT ANALYTICS INTERFACE

CROSS-REFERENCE TO RELATED APPLICATIONS

The present application is a continuation of U.S. application Ser. No. 15/808,498, filed on Nov. 9, 2017. The aforementioned application is hereby incorporated by reference in its entirety.

BACKGROUND

Analysts, firms, and other organizations increasingly use analytical processing systems to perform complex analyses on data related to products, services, trading, and other items. With the increased reliance on complex data analytics, analytical processing systems have added sophisticated methods of segmenting and visualizing datasets. For example, some existing analytical processing systems apply sophisticated algorithms to analyze large datasets in less than seconds. In some cases, for instance, the algorithms enable the analytical processing systems to identify search terms that web visitors entered before visiting and purchasing a product from a particular website. As another example, in other cases, existing analytical processing systems identify different channels from either mobile software applications or websites from which a visitor navigated to a target website. Having performed these or other analytics operations, some existing analytical processing systems provide visualizations of the segmented datasets in various area charts, bar charts, timelines, or other graphical representations.

To enable the growing number and complexity of analytics operations, some analytical processing systems have modified user interfaces to include more options. For example, many existing analytics user interfaces include an increasing number of menu options, icons, search fields, or drag-and-drop tools that capture user inputs for analytics operations. Despite the growing flexibility of some options, several existing analytics user interfaces still require an analyst to use specific computational syntax to perform an analytics operation. For instance, in some cases, an analytics user interface can capture the necessary inputs for an analytics operation only when the analyst uses corresponding Structured Query Language ("SQL") syntax.

Many analytics user interfaces have become too complex for some analysts to properly use or to rely on to efficiently automate analytics operations. The increased number and complexity of analytics-user-interface options pose an obstacle for beginning (and even experienced) analysts to apply and (in some cases) require a rigid input syntax with which inputs must comply. This decreased usability prevents firms and organizations from scaling up analytics operations and from making analytics systems accessible to a broader workforce. In addition to this decreased usability, some of the existing analytics user interfaces hinder firms and other organizations from automating complex analytics operations quickly or, for some operations, from automating the operations all together. The complex and various inputs required for some analytics operations prevent computerized analytics systems from automating such operations and slow down the analytics processing.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems use an intelligent analytics interface to process natural-language and other inputs to configure an analytics task for the system. The disclosed systems provide the intelligent analytics interface to facilitate an exchange between the systems and a user to determine values for the analytics task. The systems then use these values to execute an analytics task.

In some embodiments, for instance, the systems receive a natural-language input that a user provides via an analytics interface. The systems then determine that an intent of the natural-language input corresponds to an analytics task for the analytics system to execute. The systems subsequently identify multiple slots for the systems to use when executing the analytics task. To obtain certain values corresponding to slots, the systems customize a response corresponding to a slot from the multiple slots. When the systems receive an additional input in response to the customized response, the systems determine a slot value corresponding to the slot. In response to determining slot values for each of the multiple slots, the systems execute the analytics task using an analytical dataset and the slot values for each of the multiple slots.

The following description sets forth additional features and advantages of one or more embodiments of the disclosed systems, methods, and non-transitory computer readable media. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

FIG. 4 illustrates a schematic diagram of the analytics system of FIG. 1 in accordance with one or more embodiments.

DETAILED DESCRIPTION

Figure 1:
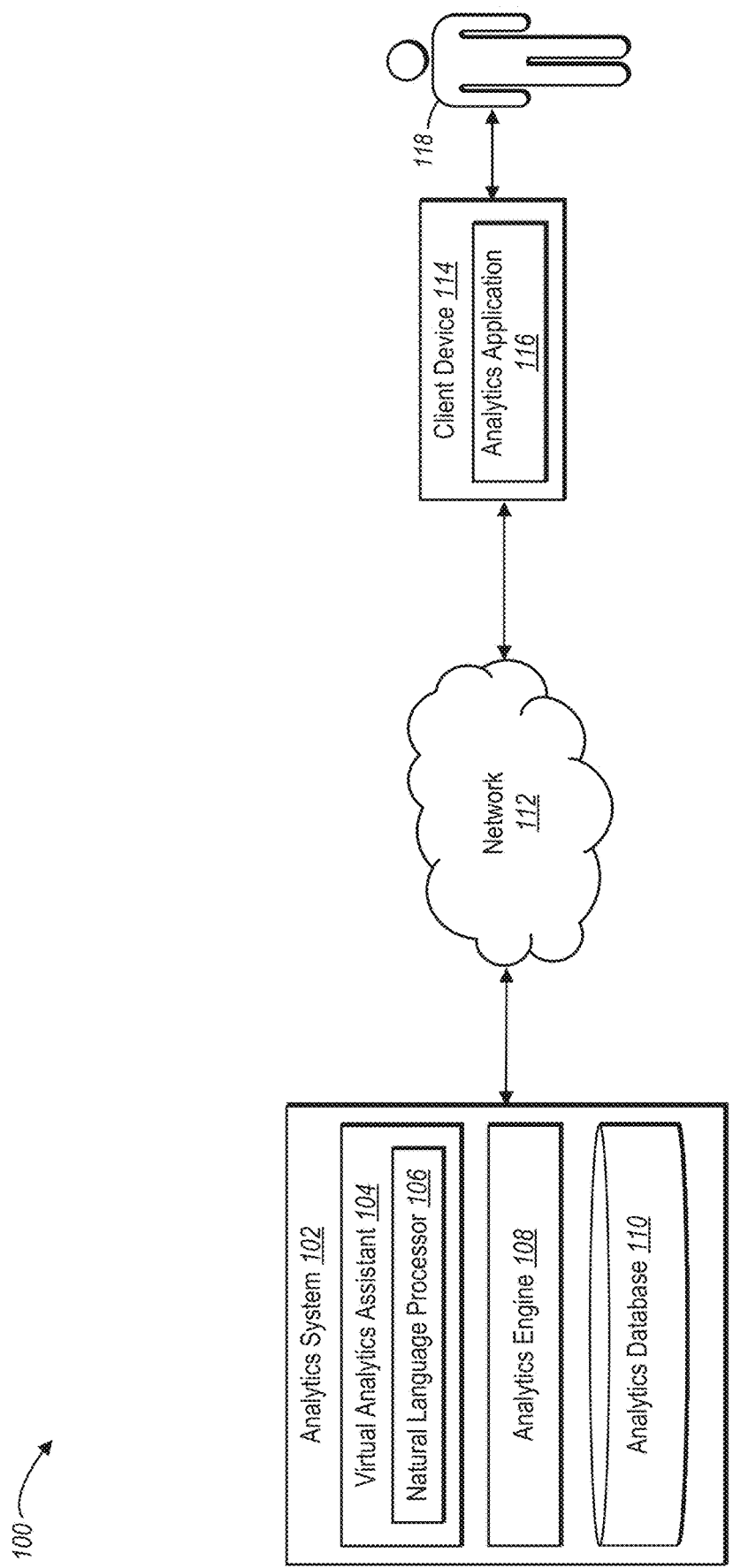
FIG. 1 illustrates a block diagram of an environment for implementing an analytics system in accordance with one or more embodiments.

This disclosure describes an analytics system that uses an intelligent analytics interface to process natural-language and other inputs to configure an analytics task for the analytics system. The disclosed analytics system provides the intelligent analytics interface to facilitate an exchange between the analytics system and a user to determine values for the analytics task. The disclosed analytics system then uses these values to execute the analytics task.

In some embodiments, for instance, the analytics system receives a natural-language input that a user provides via an analytics interface. The analytics system then determines that an intent of the natural-language input corresponds to an analytics task for the analytics system to execute. The analytics system subsequently identifies multiple slots to use when executing the analytics task. After identifying the multiple slots, the analytics system maps a first slot value from the natural-language input to a first slot from the multiple slots. But the analytics system also identifies that the natural-language input does not include a slot value corresponding to a second slot from the multiple slots.

To obtain a slot value corresponding to the second slot, the analytics system customizes a response corresponding to the second slot from the multiple slots. When the analytics system receives an additional input in response to the customized response, the system determines a second slot value corresponding to the second slot based on the additional input. This and other slot values enable the analytics system to perform the analytics task. In response to determining slot values for each of the multiple slots, the analytics system executes the analytics task using an analytical dataset and the slot values for each of the multiple slots.

As suggested above, the analytics system provides an analytics interface to facilitate the natural-language and other inputs. In some embodiments, the analytics interface includes two different types of interfaces—an analytics visualization interface and a chatbot interface. Among other things, the analytics visualization interface includes menus, icons, and other options that (when selected) trigger the analytics system to execute tasks and generate visualizations of corresponding datasets. The chatbot interface facilitates an exchange of a user's natural-language and other inputs and the analytics system's responses. The analytics system uses pre-labeled data to train a virtual analytics assistant to identify the intent of natural-language inputs and respond to inputs within the chatbot interface.

As a result of this training, in certain embodiments, the disclosed analytics system determines the intent of various natural-language inputs using natural language processing. When the analytics system determines that an input's intent corresponds to an analytics task, the analytics system optionally identifies multiple slots that correspond to the analytics task. These slots represent placeholders for values that the analytics system uses to execute the analytics task. By processing multiple iterations of training data, the analytics system learns to identify slot values from natural-language inputs, with the slot values corresponding to the slots for an analytics task.

In some embodiments, the analytics system identifies that the received natural-language or other inputs do not include a slot value corresponding to a slot. The analytics system learns to identify such missing slot values based on iterations of pre-labeled training data. In some cases, after identifying that a natural-language input lacks a slot value, the analytics system identifies a suggested slot value corresponding to the slot and customizes a response recommending the suggested slot value. By contrast, in some cases, the analytics system customizes a response that requests a slot value from the user corresponding to the slot. Through exchanges of such inputs and responses, the analytics system determines a slot value for each slot required to execute the analytics task.

In addition to executing analytics tasks, the analytics system further identifies suggested analytics tasks for the system to execute for a user. Such suggested analytics tasks may provide additional insights or reveal information related to a project that interests the user. In some embodiments, the analytics system identifies and recommends a suggested analytics task to the user when the user logs in to the analytics system or reactivates the analytics interface. Additionally, or alternatively, the analytics system identifies and recommends a suggested analytics task after executing an analytics task the user requested through natural-language inputs. In either case, the analytics system may identify a suggested analytics task based on the user's previously executed tasks, other users' previously executed tasks, or the context and subject matter of such tasks.

Beyond suggesting analytics tasks, the analytics system optionally identifies and provides tutorials (or other guidance) to a user. For example, in some embodiments, the analytics system identifies an article, video, or other medium explaining an analytics task in a tutorial (e.g., by explaining the slot values for an analytics task). As another example, in some embodiments, the analytics system identifies terms, functions, or options within the analytics visualization interface or chatbot interface to familiarize the user with various analytics tasks and slot values. As suggested above, the analytics system optionally provides or references such tutorials or guidance using the chatbot interface.

By understanding natural-language inputs and determining corresponding analytics tasks, the disclosed analytics system avoids the complexity and rigidity of some existing analytics user interfaces. Rather than mere menus, options, and various controls, the disclosed analytics system uses a unique combination of intent and slot-value identification to run analytics tasks requested by a user. The disclosed analytics system thus provides an easy-to-use analytics interface and processes natural-language inputs to perform complex analytics tasks.

Unlike some existing analytics systems' interfaces, the disclosed analytics interface enables firms and other organizations to increase both the usability and speed with which analytics tasks are executed. Indeed, the disclosed analytics system reduces a user's inputs into an analytics interface to expedite execution of an analytics task. In other words, the disclosed analytics system uses intent and slot-value identification to simplify a complex process of configuring an analytics task.

In addition to increased usability and speed, the disclosed analytics system also automates tasks that prior analytics systems could not (or have not) automated. Rather than requiring an analyst to use the syntax of a specific query language or use a specific combination of options or controls, the disclosed analytics system automates the process of configuring a complex analytics task with natural-language and other inputs. The analytic system's chatbot interface and natural-language-processing capabilities obviate the tedious inputs required by more complex interfaces that currently hinder existing analytics systems.

As used in this disclosure, the term "natural-language input" refers to an audio or textual input in a human language. For example, a natural-language input includes a spoken command or request in English for an analytics system to perform a particular analytics task (e.g., "Show me the latest results for campaign 20"). As another example, a natural-language input includes a textual command or request in French to perform a particular analytics task (e.g., "Combien de commandes avons-nous reçues en juin pour les widget?" meaning, "How many orders did we receive in June for widgets?").

The term "analytics task" refers to an operation that an analytics system performs to filter, label, query, segment, sort, surface, or otherwise analyze a dataset. For example, in some embodiments, an analytics engine may execute an analytics task by segmenting an analytical dataset to identify the websites that a visitor most commonly visited before navigating to a target website and purchasing a particular product. As another example, in some embodiments, an analytics engine may execute an analytics task by querying an analytics database to identify a target population of customers, visitors, or users according to a particular demographic. As yet another example of an analytics task, the analytics engine 108 may set up an alert that notifies a client device when an order total reaches a particular number.

Relatedly, the term "analytical dataset" refers to a dataset used by an analytics system to execute an analytics task. For example, in some embodiments, an analytical dataset comprises profile information for users of an analytics system. As another example, in some implementations, an analytical dataset comprises sales information for a particular application, organization, product, service, software, or website. As yet another example, an analytical dataset comprises conversions, purchases, visits, or views tracked for a website or webpage.

The term "slot" refers to a placeholder for a value used in an analytics task. For example, slots may include, but are not limited to, placeholders for an advertising campaign identifier, a product identifier, a software application, a time period, a website, a webpage, or some other subject matter. In some embodiments, an analytics system uses slot tags to represent different slots. For instance, the slot tags of "campaign_id," "product_id," "application_name," "time_period," "website_url," or "webpage_url" respectively correspond to the placeholders (or slots) described above.

By contrast, the term "slot value" refers to a value or informational entity used to execute an analytics task. For example, slot values may include, but are not limited to, specific informational entities for an advertising campaign identifier, a product identifier, a software application, a time period, a website, a webpage, or some other subject matter. Each slot value is a specific value, such as, "campaign 20," "product SKU 145," "Adobe Illustrator Draw App," "last month," "www.example.com," or "www.example.com/creativecloud," which correspond to the example slot tags described above.

Turning now to the figures, FIG. 1 provides an overview of an environment 100 in which an analytics system 102 operates in accordance with one or more embodiments. As illustrated in FIG. 1, the environment 100 includes the analytics system 102, a network 112, and a client device 114 with an associated user 118. As shown, the analytics system 102 and the client device 114 communicate with each other through the network 112. Although FIG. 1 illustrates one particular arrangement of the analytics system 102, the network 112, and the client device 114, various additional arrangements are possible. For example, the client device 114 may directly communicate with the analytics system 102 and thereby bypass the network 112.

As shown in FIG. 1, the client device 114 includes an analytics application 116 provided (in whole or in part) by the analytics system 102. In some embodiments, the analytics application 116 comprises a web browser, applet, or other software application (e.g., native application) available to the client device 114. Additionally, in some instances, the analytics system 102 provides data packets including instructions that, when executed by the client device 114, create or otherwise integrate the analytics application 116 within an application or webpage.

In some embodiments, the analytics system 102 communicates with the client device 114 through the analytics application 116. Additionally, the analytics application 116 optionally includes computer-executable instructions that, when executed by the client device 114, cause the client device 114 to perform certain functions. For instance, the analytics application 114 can cause the client device 114 to communicate with the analytics system 102 to access data for a particular project.

In some embodiments, when the user 118 accesses or otherwise interacts with the analytics application 116, the client device 114 presents analytical datasets provided by the analytics system 102. For example, in certain embodiments, the client device 114 receives a natural-language input from the user 114 through an interface of the analytics application 116. In some cases, the natural-language input requests that the analytics system 102 perform an analytics task.

In one or more embodiments, the client device 114 transmits the natural-language inputs (and other inputs) through the network 112 to the analytics system 102. For instance, the client device 114 may transmit data packets to the analytics system 102 with data encoding for the natural-language inputs. The client device 114 may include, but is not limited to, a mobile device (e.g., smartphone, tablet), laptop, desktop, or any other type of computing device, such as those described below with reference to FIG. 7. Similarly, the network 112 may comprise any of the networks described below with reference to FIG. 7. While FIG. 1 illustrates one client device 114, one analytics application 116, and one associated user 118, in alternative embodiments, the environment 100 includes more client devices, analytics applications, and users. For example, in some embodiments, the environment 100 includes hundreds, thousands, millions, or billions of client devices, analytics applications, and associated users.

As further shown in FIG. 1, the analytics system 102 receives natural-language inputs (and other inputs) from the client device 114 through the network 112. The analytics system 102 includes several components that (by themselves or together) process natural-language or other inputs. The analytics system 102 includes a virtual analytics assistant 104 that in turn includes a natural language processor 106. As described further below, the virtual analytics assistant 104 uses the natural language processor 106 to apply natural language processing to natural-language inputs. For example, in some embodiments, the virtual analytics assistant 104 determines an intent of a natural-language input and assigns a corresponding intent tag to represent the determined intent. As suggested above, the virtual analytics assistant 104 may determine that a natural-language input's intent is to request an analytics task.

In addition to the virtual analytics assistant 104, the analytics system 102 further includes an analytics engine 108. The analytics engine 108 executes various analytics tasks. For example, in some embodiments, the analytics engine 108 may execute an analytics task by segmenting an analytical dataset to identify the websites that a visitor most commonly visited before navigating to a target website and purchasing a particular product. As another example, in some embodiments, the analytics engine 108 may execute an analytics task by querying an analytics database to identify a target population of customers, visitors, or users according to a particular demographic. As yet another example of an analytics task, the analytics engine 108 may set up an alert that notifies the client device 114 when an order total reaches a particular number.

Before executing an analytics task, however, the analytics system 102 identifies slots for the analytics task and maps slot values from a natural-language input to the identified slots. As noted above, the term "slot" refers to a placeholder for a value used in an analytics task. For example, slots may include, but are not limited to, placeholders for an advertising campaign identifier, a product identifier, a software application, a time period, a website, a webpage, or some other subject matter. In some embodiments, the analytics system 102 uses slot tags to represent different slots. For instance, the slot tags of "campaign_id," "product_id," "application_name," "time_period," "website_url," or "webpage_url" respectively correspond to the placeholders (or slots) described above.

As also noted above, the term "slot value" refers to a value or informational entity used to execute an analytics task. For example, slot values may include, but are not limited to, specific informational entities for an advertising campaign identifier, a product identifier, a software application, a time period, a website, a webpage, or some other subject matter. Each slot value is a specific value, such as, "campaign 20," "product SKU 145," "Adobe Illustrator Draw App," "last month," "www.example.com," or "www.example.com/creativecloud," which correspond to the example slot tags described above. The analytics system 102 uses the slot values as inputs to execute an analytics task with a corresponding function. In other words, a slot value can be a value the analytics system 102 uses as part of a function.

As further shown in FIG. 1, the analytics system 102 includes an analytics database 110. In one or more embodiments, the analytics system 102 accesses and queries data for an analytics task from the analytics database 110. Additionally, or alternatively, the analytics system 102 sends data to the analytics database 110 for storage. The analytics database 110 optionally stores data organized by application, product, project, user, website, or any other dimension. For example, the analytics database 110 may store data related to an advertising campaign by marking the data with an appropriate metadata tag for the campaign.

As suggested by FIG. 1, in some embodiments, one or more servers separately include the virtual analytics assistant 104, the analytics engine 108, and the analytics database 110. By contrast, in other embodiments, a single server may include each of the virtual analytics assistant 104, the analytics engine 108, and the analytics database 110, or each of the virtual analytics assistant 104, the analytics engine 108, and the analytics database 110 may be implemented across multiple servers. Regardless, in some embodiments, the analytics system 102 comprises computer-executable instructions that cause the server(s) to perform the various functions, features, processes, and methods described herein. The servers comprising the virtual analytics assistant 104, the analytics engine 108, and the analytics database 110 may be content servers. Alternatively, the servers may also comprise a communication server or a web-hosting server. Additional details regarding the servers that comprise the virtual analytics assistant 104, the analytics engine 108, and the analytics database 110 will be discussed below with respect to FIG. 7.

In addition or in the alternative to the arrangement shown in FIG. 1, some of the components of the analytics system 102 may be hosted by or reside on third-party servers. For example, third-party server(s) may include or host the natural language processor 106 (or a portion of the natural language processor 106). Additionally, third-party server(s) may include or host the analytics database 110 (or a portion of the analytics database 110). In some such embodiments, the virtual analytics assistant 104 and the analytics engine 108 may communicate with the natural language processor 106 or the analytics database 110 over the network 112.

In addition to executing analytics tasks, in some embodiments, the analytics system 102 tracks user data. In one or more embodiments, the analytics system 102 tracks various user data related to the communications between client devices and third-party network server(s) (not shown), including data associated with analytics applications. For example, the analytics system 102 tracks user data that represents webpages visited by users or analytics tasks requested or referenced by users. Additionally, or alternatively, any one of the analytics applications tracks user data that represent the same actions performed by one of the associated users.

The analytics system 102 tracks user data in various ways. In one or more embodiments, third-party network server(s) tracks the user data and then reports the tracked user data to the analytics system 102. Alternatively, the analytics system 102 receives tracked user data directly from the client device 114 and other client devices. In particular, the analytics system 102 may receive information through data stored on a client device (e.g., data associated with an analytics application, software application metadata, a browser cookie, cached memory), embedded computer code (e.g., tracking pixels or other code for tracking websites visited), a user profile, or engage in any other type of tracking technique. Accordingly, the analytics system 102 can receive tracked user data from the third-party network server(s), the network 112, and/or various client devices.

Figure 2A:
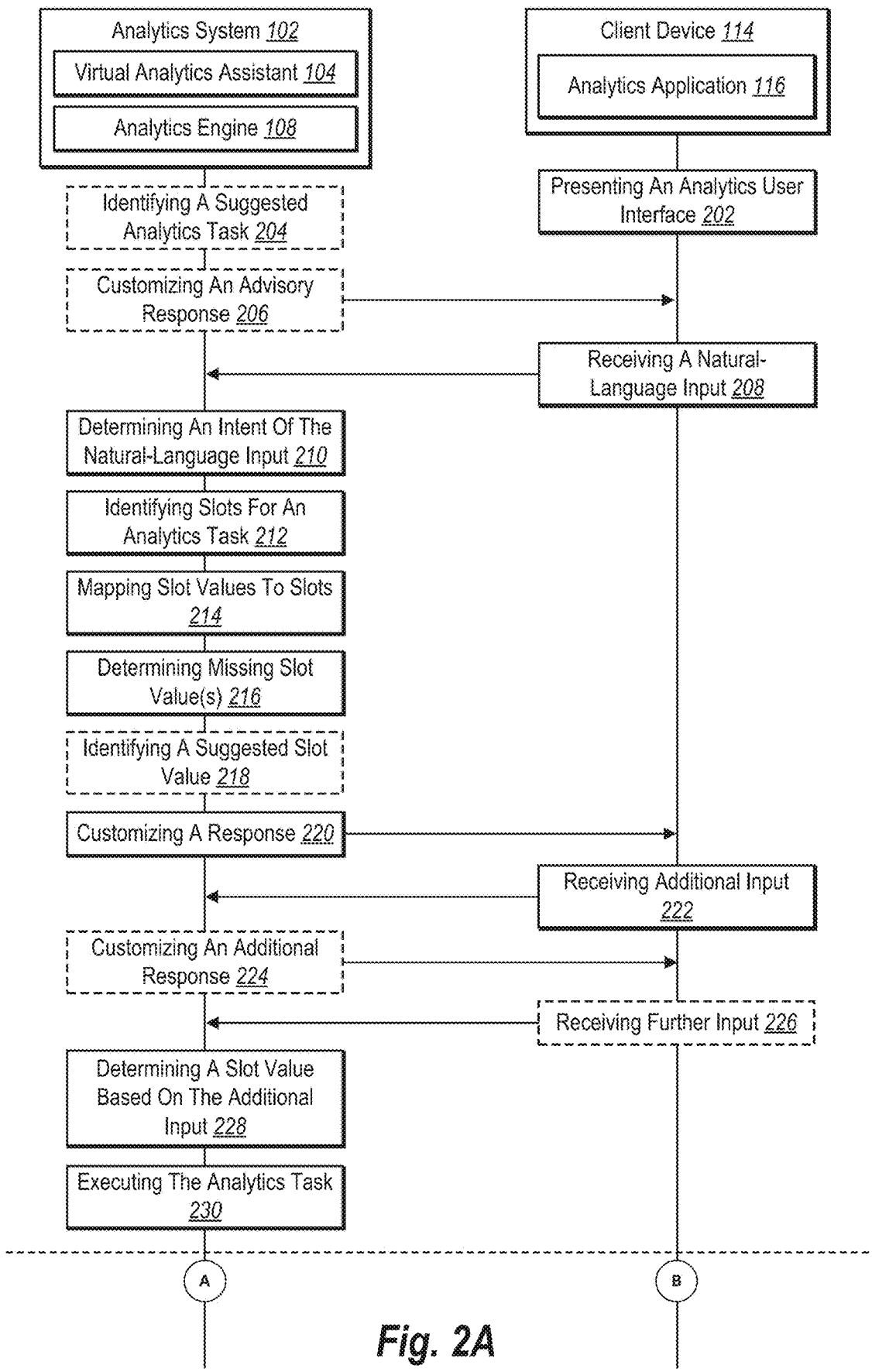
FIGS. 2A-2B illustrate sequence-flow diagrams of an analytics system receiving natural-language inputs from a user through an analytics interface and executing an analytics task based on the natural-language inputs in accordance with one or more embodiments.
Figure 2B:
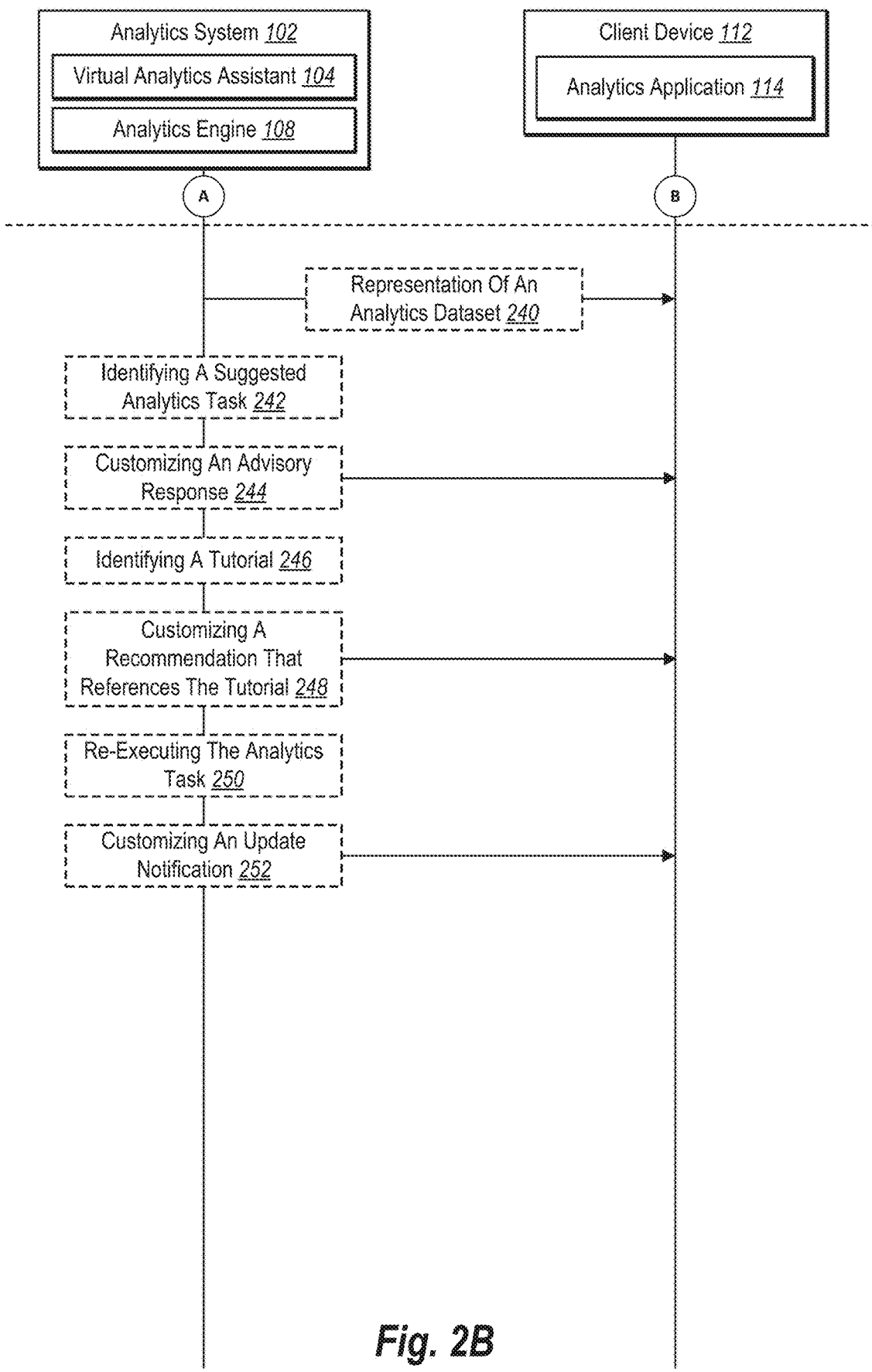

Turning now to FIGS. 2A and 2B, these figures provide an overview of embodiments of the analytics system 102 that receive one or more natural-language inputs from a user through an analytics interface and execute an analytics task based on the natural-language inputs. Specifically, FIGS. 2A and 2B illustrate a sequence of acts 202-252 that the analytics system 102 or the client device 114 perform. In some embodiments, for example, the analytics system 102 or the analytics application 116 comprise computer-executable instructions that respectively cause server device(s) (e.g., of the analytics system 102) or the client device 114 to perform one or more of the acts 202-252. Rather than repeatedly describe the instructions within the analytics system 102 or the analytics application 116 as respectively causing the server device(s) or the client device 114 to perform certain acts, this disclosure primarily describes the analytics system 102 or the client device 114 as performing the acts 202-252 as a shorthand for those relationships.

Turning now to those acts, as shown in FIG. 2A, the client device 114 performs the act 202 of presenting an analytics user interface. For example, in some embodiments, the client device 114 opens a software application corresponding to the analytics system 102. Alternatively, the client device 114 receives a Uniform Resource Locator ("URL") within a web browser that corresponds to the analytics system 102. Upon opening the software application or receiving the URL, the analytics user interface optionally includes credential fields requiring credentials for the user 118 to log in to a user account for the analytics system 102 (e.g., a username and password). The user 118 may have his or her separate user account or a share user account (e.g., for an organization or team). In response to opening the software application, receiving the URL, or logging in to a user account, the client device 114 optionally presents the analytics user interface.

As noted above, in some embodiments, the analytics user interface includes both an analytics visualization interface and a chatbot interface. In some circumstances, the analytics visualization interface includes various options that (when selected) trigger the analytics system to execute analytics tasks and generate visualizations of corresponding datasets. For example, in certain embodiments, the analytics visualization interface includes menu options, icons, search fields, drag-and-drop tools and other options that (when selected) capture inputs for analytics tasks to be performed by the analytics system 102.

Figure 3A:
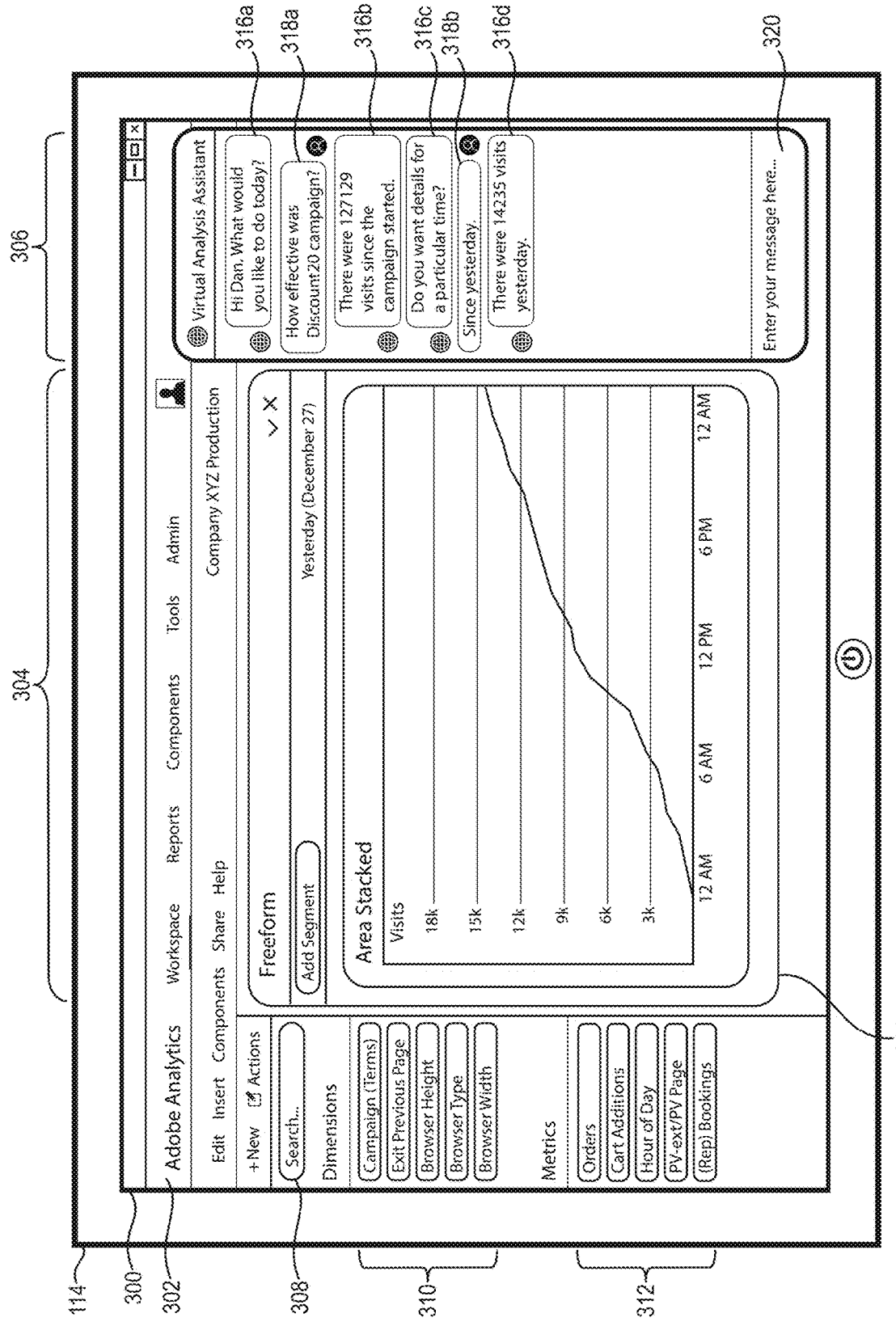
FIGS. 3A-3B illustrate an analytics interface that receives natural-language inputs (or other inputs) and provides responses to facilitate executing an analytics task in accordance with one or more embodiments.
Figure 3B:
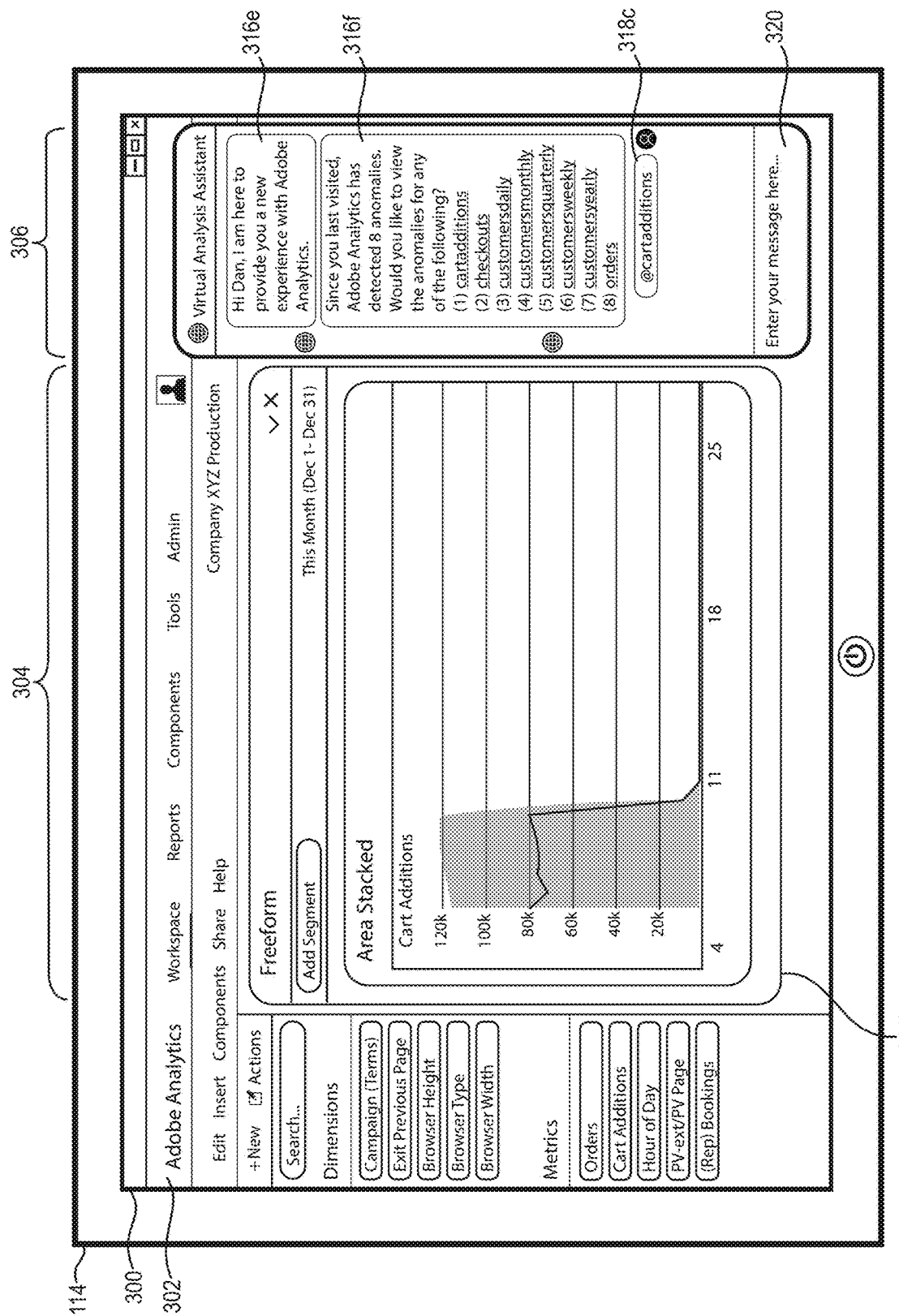

By contrast, in some embodiments, the chatbot interface facilitates an exchange of a user's inputs and the analytics system 102's responses. User inputs include, but are not limited to, natural-language inputs, selections from various options presented within the chatbot interface, or specialized language inputs for the chatbot interface (e.g., cue symbols having specific meanings or references, such as "@" or "#"). As explained below, FIGS. 3A and 3B provide an example of the analytics visualization interface and the chatbot interface, as well as user inputs and responses from the analytics system 102.

After the client device 114 opens a software application or navigates to a URL corresponding to the analytics system 102, the analytics system 102 optionally performs the act 204 of identifying a suggested analytics task and the act 206 of customizing an advisory response. As indicated by the arrow corresponding to the act 206, the analytics system 102 also sends the customized advisory response to the client device 114 for presentation within the analytics interface. The customized advisory response references the identified analytics task as a suggested analytics task for the user 118 to consider. In some such embodiments, the analytics system 102 identifies a suggested analytics task and customizes an advisory response before receiving a natural-language or other input from the client device 114. In other words, during a given session, the analytics system 102 may identify and suggest an analytics task to the user 118 without (or before) receiving natural-language inputs or other inputs in a chatbot interface from the user 118.

When performing the act 204, the analytics system 102 may use a variety of methods to identify one or more analytics tasks as suggestions for the user 118. For example, the analytics system 102 optionally identifies analytics tasks by determining a frequency an analytics task has been requested by users for a given time period. In some cases, for instance, the analytics system determines an analytics task performed by most users of the analytics system 102 or by most of the similar users to the user 118 (e.g., users in a same industry or same job function). Additionally, or alternatively, the analytics system 102 identifies analytics tasks by determining a recently performed analytics task requested by users for a given time period, such as an analytics task requested by most users of the analytics system 102 or by most of the similar users to the user 118.

In addition or in the alternative to the identification methods just described, the analytics system 102 optionally identifies analytics tasks by determining a similar task requested by users for a given time period. In some such cases, for instance, the analytics system 102 determines an analytics task with different dimensions than the analytics task most recently requested by the user (e.g., the same segmenting task using orders instead of cart additions as a dimension) or an analytics task most recently requested by the user 118 but using an updated dataset. Additionally, the analytics system 102 may determine an analytics task most commonly requested by users relating to the subject matter of the most recently requested analytics task by the user 118 (e.g., commonly requested analytics tasks for advertising campaigns, sales growth, orders, or payroll).

As another option, the analytics system 102 optionally identifies analytics tasks by determining an ordered sequence of analytics tasks requested by users for a given time period, such as by determining an analytics task most commonly requested by users after another analytics task has been performed. Relatedly, in certain embodiments, the analytics system 102 identifies analytics tasks related to the user 118's projects or a recently executed analytics task requested by the user 118. For example, in some embodiments, the analytics system 102 identifies analytics tasks for detecting anomalies related to a project for a particular advertising campaign, application, organization, product, website, or some other subject.

In addition to the identification methods described above, the analytics system 102 may likewise use any suitable method to identify an analytics task to suggest to the user 118. Regardless of whether the analytics system 102 identifies the suggested analytics task based on frequency, recent performance, similarity, ordered sequencing, or relatedness—as explained above—or some other method, the analytics system 102 optionally identifies multiple suggested analytics tasks from which the user 118 may select (e.g., three most commonly requested analytics tasks after performing a given analytics task). The analytics system 102 may also make each such determination for any particular time period (e.g., frequency or recent performance within the last few days, last week, last month). Accordingly, the analytics system 102 may identify a different analytics task to suggest to the user 118 depending on the time period.

After identifying the analytics task, the analytics system 102 customizes an advisory response referencing the identified analytics task as a suggested analytics task. For example, the analytics system 102 may combine a template message for suggesting an analytics task and one or more of the identified analytics tasks to customize an advisory response for the user 118.

As suggested above, in some embodiments, the analytics system 102 inputs pre-labeled data into the virtual analytics assistant 104 to train the virtual analytics assistant 104 to generate natural-language messages suggesting an analytics task. The analytics system 102 uses, for example, pre-labeled data of natural-language messages created by humans suggesting an analytics task to train the virtual analytics assistant 104 to generate an advisory response in a natural-language message. Additionally, or alternatively, the analytics system 102 causes the client device 114 to present selectable options (or short-form references) representing the identified analytics tasks within the chatbot interface. As explained below, FIG. 3B illustrates a customized advisory response within a chatbot interface.

As an example of a suggested analytics task, the analytics system 102 may identify analytics tasks that determine key performance indicators ("KPIs") for a particular time period and for a particular advertising campaign, product, organization, order type, or other subject matter or slot value. In some cases, for instance, the analytics system 102 identifies an analytics task that determines a sales growth (expressed in percentage of growth in revenue) for an organization for a year to date. In some circumstances, for example, the analytics system 102 identifies an analytics task that determines a number of unique visitors to a particular website over the last week. As an example of a customized advisory response, the analytics system 102 may generate and send an advisory response in natural language suggesting that the analytics system 102 execute a particular analytics task (e.g., "Would you like to see sales growth for the year to date?" or "Would like to see the number of unique visitors for www.example.com over the last week?").

Regardless of when or whether the analytics system 102 suggests an analytics task, the analytics system 102 both receives and processes natural-language inputs. As shown in FIG. 2A, the client device 114 performs the act 208 of receiving a natural-language input. As indicated by the arrow associated with the act 208, the client device 114 also sends (and the analytics system 102 receives) the natural-language input. For example, the client device 114 optionally sends (and the analytics system 102 receives) data packets comprising data encoding for a natural-language-audio input (e.g., as a digital audio file) or a natural-language-textual input (e.g., as text).

As just noted, in some embodiments, the client device 114 receives a natural-language-audio input. For example, in some instances, the client device 114 receives a spoken request indicating an analytics task or some other input. The client device 114 optionally includes a microphone or some other audio-capturing device that captures or records the natural-language-audio input. The client device 114 optionally creates or stores (at least temporarily) a digital audio file of the natural-language-audio input.

In addition to capturing a natural-language-audio input, either one or both the client device 114 and the analytics system 102 uses a speech-to-text application to transcribe the natural-language-audio input into text. Upon transcribing or receiving a transcription of the natural-language-audio input, the client device 114 presents the transcription within an analytics interface (e.g., within the chatbot interface). For example, in some embodiments, the client device 114 or the analytics system 102 uses a publicly available speech-to-text application from Adobe Premiere Pro to analyze the natural-language-audio input and transcribe it into text. But the client device 114 or the analytics system 102 may also use other publicly available speech-to-text applications suitable for transcription.

Additionally, or alternatively, in some embodiments, the client device 114 or the analytics system 102 applies a Hidden Markov Model ("HMM") for speech recognition (sometimes combined with a feedforward artificial neural network) to transcribe the natural-language-audio input into text. Similarly, in some embodiments, the client device 114 or the analytics system 102 applies the deep learning method of long short-term memory ("LSTM") that uses a recurrent neural network, as described by Sepp Hochreiter and Jurgen Schmidhuber, "Long Short-Term Memory, Neural Computation, Volume 9, Issue 8, pp. 1735-1780 (1997), which is hereby incorporated by reference in its entirety. But the client device 114 or the analytics system 102 may use any speech recognition algorithm to transcribe text from speech, including those described by Dong Yu and Li Deng, "Automatic Speech Recognition" (Springer 2014), which is hereby incorporated by reference in its entirety.

In addition to receiving a natural-language-audio input, in some embodiments, the client device 114 receives a natural-language-textual input. For example, in some cases, the client device 114 captures a natural-language-textual input from a physical or virtual keyboard of the client device 114. Alternatively, the client device 114 captures a natural-language-textual input by detecting touch gestures on a touch screen that the client device 114 transcribes into text. Regardless of whether the client device 114 captures the natural-language-textual input with a keyboard or touchscreen, the client device 114 may capture the natural-language-textual input letter-by-letter, character-by-character, or stroke-by-stroke.

As further shown in FIG. 2A, after receiving the natural-language input, the analytics system 102 performs the act 210 of determining an intent of the natural-language input. For example, in some embodiments, the analytics system 102 determines that an intent of the natural-language input corresponds to an analytics tasks for the analytics system 102 to execute. In some such embodiments, the analytics system 102 applies natural language processing to assign (to the natural-language input) an intent tag or intent label representing the intent of the natural-language input (e.g., an intent tag representing a request for an analytics task).

To determine an intent of a natural-language input, the analytics system 102 optionally uses a natural language processing ("NLP") application locally stored within the analytics system 102 (e.g., as part of the virtual analytics assistant 104). For example, in some embodiments, the analytics system 102 uses a publicly available NLP application, such as Microsoft Corporation's Language Understanding Intelligent Service ("LUIS"), Facebook, Inc.'s Wit.ai, or Google Inc.'s API.ai. In some such embodiments, the analytics system 102 stores and executes an open source version of LUIS, Wit.ai, API.ai, or some other publicly available NLP application (or portion thereof) to determine an intent of the natural-language input.

Instead of using a commercial NLP application, in some embodiments, the analytics system 102 trains and applies a classifier algorithm to determine an intent of various natural-language inputs, such as a Support Vector Machine ("SVM") classifier or a maximum entropy classifier. For example, the analytics system 102 optionally applies an SVM classifier to natural-language inputs to determine an intent of each natural-language input. In some such embodiments, the analytics system 102 applies NLP intent analysis to each input, such as by using NLP open-source software available from the Stanford Natural Language Processing Group from Stanford University, California. In certain embodiments, the analytics system 102 uses an SVM classifier described by C. Cortes and V. Vapnik, "Support-Vector Networks," Machine Learning, Vol. 20, Issue 3, pp. 273-297 (1995), which is hereby incorporated by reference in its entirety. By contrast, in some embodiments, the analytics system 102 applies a maximum entropy classifier described in A. McCallum, D. Freitag, and F. C. Pereira, "Maximum Entropy Markov Models for Information Extraction and Segmentation," 17th International Conf. on Machine Learning (2000), which is hereby incorporated by reference in its entirety.

Instead of using an SVM classifier, in certain embodiments, the analytics system 102 trains and applies a recurrent neural network ("RNN") model to determine an intent of various natural-language inputs. For example, the analytics system 102 optionally applies an RNN model to natural-language inputs to determine an intent of each natural-language input. RNNs include feedback connections from one time stamp to a next time stamp. Accordingly, an RNN model can incorporate previous context when modeling temporal dependencies in data. In certain embodiments, the analytics system 102 uses one of the RNN models for natural-language processing described by Yoav Goldberg, Neural Network Methods for Natural Language Processing: Synthesis Lectures on Human Language Technologies, Graeme Hirst ed., Morgan & Claypool Publishers (2017), which is hereby incorporated by reference in its entirety.

In the alternative to using a locally stored NLP application, the analytics system 102 uses a NLP application accessed from a third party. For example, the analytics system 102 may send an application program interface ("API") call to a third-party server. In such embodiments, the analytics system 102 sends an API call using a particular protocol requesting that the NLP application determine the intent of a natural-language input. For example, the analytics system 102 optionally uses an API protocol for a third-party server running LUIS, Wit.ai, or API.ai to determine the intent of a natural-language input. After applying the NLP application, the third-party server sends an indication of the intent for the natural-language input to the analytics system 102 (e.g., as data packets comprising data encoding a representation of the intent).

Regardless of whether the analytics system 102 uses a locally stored or remote NLP application, the analytics system 102 trains the NLP application to determine the intent of natural-language inputs. For example, in some embodiments, the analytics system 102 iteratively inputs pre-labeled training data representing various natural-language inputs into the NLP application. By iteratively inputting the pre-labeled training data into the NLP application, the analytics system 102 verifies or corrects the intent tag that the NLP application assigns to the various natural-language inputs.

As part of this training, the pre-labeled training data optionally includes intent tags identifying the intent for the various natural-language inputs. In some embodiments, the intent tags are specific to analytics tasks, such as a "get_campaign_effectiveness" tag or a "query_product_orders" tag. To facilitate executing analytics tasks, in certain embodiments, the analytics system 102 creates an intent tag for some or all the analytics tasks the analytics system 102 executes. As explained below, the analytics system 102 optionally assigns slots to each intent tag to facilitate executing an analytics task.

As further shown in FIG. 2A, after determining an intent of the natural-language input, the analytics system 102 performs the act 212 of identifying slots for an analytics task. To identify slots for an analytics task, the analytics system 102 maps an identified analytics task to slots the analytics system 102 previously assigned to the task. The analytics system 102 optionally receives one or more assigned slots for each analytics task from a programmer (e.g., in a programming language) or from a database. The database may be, for example, a referential table or graph mapping each analytics task (e.g., as represented by an intent tag) to one or more slots as assigned by a programmer. In some such embodiments, the analytics engine 108 or analytics database 110 stores preassigned slots for each analytics task. The analytics system 102 then uses the referential table, graph, or other database to identify slots for an analytics task.

As further shown in FIG. 2A, after identifying slots for an analytics task, the analytics system 102 performs the act 214 of mapping slot values to slots. In general, the analytics system 102 identifies slot values from within natural-language inputs (or other user inputs) and maps the identified slot values to slots for a particular analytics task. In some such embodiments, the analytics system 102 assigns a slot tag to each term within a natural-language input. For example, the analytics system 102 may assign a term a slot tag of "campaign_id," "product_id," "application_name," etc. Additionally, in some cases, the analytics system 102 also assigns a term with a more general slot tag of "CC" for a coordinating conjunction or "JJ" for adjective (i.e., part-of-speech tags). In some embodiments, the analytics system 102 does not use the terms corresponding to the more general slot tags to execute the analytics task, but rather to identify terms that may include slot values.

After assigning slot tags, the analytics system 102 identifies a term associated with the assigned slot tags. For example, the analytics system 102 may identify from within a natural-language input that the term "campaign 20" corresponds to the slot tag "campaign_id," the term "product SKU 145" corresponds to the slot tag "product_id," or the term "Adobe Illustrator Draw App" corresponds to the slot tag "application_name." The analytics system 102 later uses such terms as slot values to execute the analytics task identified as part of the act 210.

In some embodiments, the analytics system 102 uses the slot-filling functions of a publicly available NLP application, such as LUIS, Wit.ai, or API.ai. In some such embodiments, the analytics system 102 use a training interface for the NLP application (e.g., a web-based training interface) to train the NLP application to assign slots to terms within natural-language inputs and to identify terms corresponding to slots for an analytics task. By iteratively inputting the pre-labeled training data into the NLP application, the analytics system 102 verifies or corrects the slot tag that the NLP application assigns to each term within various natural-language inputs and the terms the NLP application associates with a slot tag.

Additionally, or alternatively, the analytics system 102 uses a graphical model to label terms within a natural-language input with slot tags. For example, in some embodiments, the analytics system 102 uses the graphical model described in J. Lafferty, A. McCallum, F. Pereira, et al., "Conditional Random Fields: Probabilistic Models for Segmenting and Labeling Sequence Data," Vol. 1, Proceedings of the Eighteenth International Conference on Machine Learning, pp. 282-289 (2001), which is hereby incorporated by reference in its entirety.

As further shown in FIG. 2A, after mapping slot values to slots, the analytics system 102 performs the act 216 of determining missing slot value(s). In general, when performing the act 216, the analytics system 102 determines whether a natural-language input includes one or more slot values for an analytics task. The analytics system 102 previously determined that the natural-language input's intent corresponds to an analytics task. Having made that determination, the analytics system 102 determines whether the natural-language input (or some other input from the user 118) includes slot values corresponding to the slots assigned to the analytics task.

To determine missing slot values, the analytics system 102 analyzes the terms in a natural-language input. For example, in some embodiments, the analytics system 102 determines whether it has assigned each slot corresponding to an identified analytics task to terms within one or more natural-language inputs. For purposes of explanation, this disclosure uses the term "missing slot" to refer to a slot that corresponds to an identified analytics task and, to which the analytics system 102 has not mapped or assigned a value (e.g., a term from the natural-language input). When the analytics system 102 has not mapped any term from the natural-language input to a particular slot—that is, identifies a missing slot—the analytics system 102 determines that the natural-language input is missing a slot value.

For example, in one embodiment, the analytics system 102 may receive a natural-language input that requests, "Show me the latest results for campaign 20." After determining that the intent of the natural-language input corresponds to an intent tag of "get_campaign_effectiveness," the analytics system 102 identifies the slots of "campaign_id" and "time_period" for the intent tag. The analytics system 102 determines that the term "campaign 20" from the natural-language input represents a slot value corresponding to the slot of "campaign_id." But the analytics system 102 also determines that the natural-language input does not include a term corresponding to the slot "time_period" for the analytics task. Based on determining that the natural-language input lacks a term corresponding to the slot "time_period," the analytics system 102 determines that the natural-language input is missing a slot value.

In the example above, the analytics system 102 analyzes one natural-language input and identifies one missing slot value in this particular example. In some embodiments, however, the analytics system 102 analyzes multiple natural-language inputs (e.g., the last two or three natural-language inputs) and determines multiple missing slot values. For example, in one embodiment, the analytics system 102 determines that the natural-language input does not include a term corresponding to the slot "effectiveness metric" for the analytics task and, therefore, is missing an additional slot value.

As further shown in FIG. 2A, in addition to identifying missing slot values, the analytics system 102 optionally performs the act 218 of identifying a suggested slot value. To identify the suggested slot value, the analytics system 102 determines that a particular slot corresponding to an identified analytics task cannot be mapped or assigned to terms within a natural-language input. In other words, the analytics system 102 cannot find a missing slot in the natural-language input. The analytics system 102 subsequently identifies a slot value corresponding to the missing slot as a suggested slot value. In some embodiments, the analytics system 102 identifies multiple suggested slot values when it cannot map or assign terms from a natural-language input or multiple natural-language inputs to the missing slot values.

The analytics system 102 uses a variety of methods to identify a suggested slot value corresponding to a missing slot. In some embodiments, for example, the analytics system 102 identifies a list of potential slot values corresponding to the missing slot. For example, the analytics system 102 may identify a list of potential slot values related to the user 118's projects that correspond to the missing slot value.

Additionally, or alternatively, in some embodiments, the analytics system 102 identifies slot values from previously executed analytics tasks requested by the user 118 that also correspond to the missing slot value. Similarly, in some embodiments, the analytics system 102 identifies slot values from previously executed analytics tasks requested by similar users to the user 118 that also correspond to the missing slot value. Such similar users may be, but are not limited to, users within a same organization, department, team, or with a same job title as the user 118.

The analytics system 102 may also use previous natural-language inputs to identify a suggested slot value. For example, in some embodiments, the analytics system 102 identifies slot values that correspond to the missing slot from natural-language inputs of the user 118 within a given time period (e.g., one year, three months). Similarly, the analytics system 102 optionally identifies slot values that correspond to the missing slot from natural-language inputs of users similar to the user 118 within a given time period (e.g., users within a same organization).

As further shown in FIG. 2A, after determining missing slot values or identifying suggested slot values, the analytics system 102 performs the act 220 of customizing a response.

As indicated by the arrow corresponding to the act 220, the analytics system 102 also sends the customized response to the client device 114 for presentation within the analytics interface. In some embodiments, the analytics system 102 customizes a response to request one or more slot values corresponding to missing slot value(s). By contrast, in some embodiments, the analytics system 102 customizes a response to recommend one or more suggested slot values corresponding to a missing slot value.

When customizing a response to request a slot value, the analytics system 102 optionally combines a template message for requesting a slot value and an indication of the missing slot. For example, the analytics system 102 optionally combines a template message of "Do you want details for a particular [placeholder]?" with an indication of the slot for "time period" to customize a response that requests, "Do you want details for a particular time period?" Alternatively, the analytics system 102 uses a predetermined message corresponding to a particular missing slot, such as a predetermined message asking, "What time period are you interested in?" The foregoing template and predetermined messages are merely examples. In certain embodiments, the analytics system 102 includes a template message or predetermined message appropriate for any missing slot.

Similarly, when customizing a response to recommend suggested slot values, the analytics system 102 optionally combines a template message for suggesting slot values and an indication of one or more suggested slot values. For example, the analytics system 102 optionally combines a template message of "Are you interested in [placeholder]?" with an indication of the suggested slot values of "views," "visits," and "orders" to customize a response that says, "Are you interested in views, visits, or orders?"

In some embodiments, the analytics system 102 customizes a response to include selectable options for each suggested slot value. For example, the analytics system 102 may create a selectable option for each of the suggested slot values of "views," "visits," and "orders" that (when selected) sends an additional input to the analytics system 102 indicating the selected slot value. Again, the foregoing template messages are merely examples, and the analytics system 102 optionally includes a template message appropriate for any missing slot and recommended slot value.

As suggested above, in some embodiments, the analytics system 102 inputs pre-labeled data into the virtual analytics assistant 104 to train the virtual analytics assistant 104 to customize responses. The analytics system 102 uses, for example, pre-labeled data of natural-language messages created by humans either requesting a slot value or recommending a suggested slot value to train the virtual analytics assistant 104 to customize a response in a natural-language message. The analytics system 102 optionally trains the virtual analytics assistant 104 to customize the response for presentation within the chatbot interface. As explained below, FIG. 3A illustrates a customized response within a chatbot interface.

In addition or in the alterative to a textual response, in some embodiments, the analytics system 102 sends the customized response in the form of an audio response. For example, in some embodiments, the analytics system 102 uses a text-to-speech application that generates a customized audio response that vocalizes the customized textual response. In some instances, the analytics application 116 includes a text-to-speech application that generates such a customized audio response. Alternatively, in some embodiments, the analytics system 102 customizes the response and sends a digital audio file comprising the response to the client device 114 (e.g., as an audio stream or digital audio file). The client device 114 in turn plays or produces the customized response (e.g., as an audio stream or digital audio file).

After the client device 114 receives the customized response and presents or plays the customized response, the client device 114 performs the act 222 of receiving additional input. As indicated by the arrow associated with the act 222, the client device 114 also sends (and the analytics system 102 receives) the additional input. For example, the client device 114 optionally sends (and the analytics system 102 receives) data packets comprising data representative of a natural-language-audio input (e.g., as an audio stream or digital audio file) or a natural-language-textual input (e.g., as text).

As suggested above, in some embodiments, the client device 114 receives an additional input indicating a slot value. In other words, the additional input replies to the customized response by including a slot value. In certain embodiments, the additional input indicates a slot value corresponding to a slot identified within the customized response (e.g., a missing slot). In some embodiments, however, the additional input indicates a slot value or some other subject matter that does not correspond to a slot identified within the customized response. As described below, in some such embodiments, the analytics system 102 customizes an additional response to obtain an additional slot value.

As suggested by their descriptions in FIG. 2A, the act 222 is similar to the act 208. Accordingly, the description and embodiments set forth above for the act 208 applies to the act 222. In contrast to the act 208, however, the latter act 222 involves a reply to a customized response and, in some embodiments, may include a non-natural-language input. Indeed, in some embodiments, the client device 114 receives and sends an additional input that indicating a selection of a suggested slot value.

For example, in certain embodiments, the customized response includes selectable options corresponding to suggested slot values. Accordingly, the client device 114 optionally detects a selection of a selectable option for a suggested slot value and then sends an indication of the selection to the analytics system 102. In some such embodiments, the client device 114 sends (and the analytics system 102 receives) data packets comprising data representing or indicating a suggested slot value selected by the user 118.

As noted above, the additional input sometimes indicates a slot value or some other subject matter that does not correspond to a slot identified within the customized response. In other words, at times, the additional input includes an incompatible slot value that does not correspond to the slot identified within the customized response. The analytics system 102 includes computer-executable instructions that attempt to resolve this incompatibility by causing the server device(s) to seek further input from the client device 114.

As shown in FIG. 2A, the analytics system 102 optionally performs the act 224 of customizing an additional response. As indicated by the arrow corresponding to the act 224, the analytics system 102 also sends the customized additional response to the client device 114 for presentation within the analytics interface. In reply, the client device 114 optionally performs the act 226 of receiving further input. As indicated by the arrow associated with the act 226, the client device 114 also sends (and the analytics system 102 receives) the further input.

As suggested by their descriptions in FIG. 2A, the acts 224 and 226 are respectively similar to the acts 220 and 222. Accordingly, the description and embodiments set forth above for the acts 220 and 222 respectively apply to the acts 224 and 226. In contrast to the acts 220 and 22, however, the acts 224 and 226 involve an additional exchange with an additional customized response seeking an additional input comprising an additional slot value corresponding to the missing slot. In short, the additional response seeks an additional slot value compatible with the missing slot.

In some embodiments, for example, the analytics system 102 customizes an additional response that describes the missing slot and requests an additional slot value that corresponds to the missing slot. The additional response may include a definition of the missing slot. To take but one example, the additional response may include text or audio explaining that a "campaign identifier" is a unique name, number, or code that identifies an advertising campaign. As part of the additional response's description, the additional response may include examples of slot values that correspond to the missing slot (e.g., "campaign 20" or "march social media campaign").

In reply to the additional response, the user 118's further input optionally identifies a slot value corresponding to the missing slot. But if the further input comprises another incompatible slot value, the analytics system 102 may customize further responses (and the client device 114 may receive further inputs) in an attempt to identify a slot value that corresponds to the missing slot.

As further shown in FIG. 2A, after receiving an additional input, the analytics system 102 performs the act 228 of determining a slot value based on the additional input. In other words, the analytic system 102 uses the additional input to determine a slot value corresponding to a missing slot. This determination differs depending on whether the additional input comprises an indication of a selection from the client device 114 or an additional natural-language input. In some embodiments, for example, the analytics system 102 receives an indication of a selection of a suggested slot value from the client device 114. Upon receiving the indication, the analytics system 102 maps the suggested slot value to the missing slot.

By contrast, in certain embodiments, the analytics system 102 analyzes an additional natural-language input to identify terms that correspond to a missing slot. Upon identifying a term that corresponds to the missing slot, the analytics system 102 determines that the term represents the slot value. In some such embodiments, for instance, the analytics system 102 assigns a slot tag to each term within an additional natural-language input. The term assigned the slot tag representing the missing slot represents the slot value.

For example, the analytics system 102 may assign a term a slot tag of "campaign_id," "product_id," "application_name," or some other slot tag representing a missing slot. When the analytics system 102 assigns a slot tag representing the missing slot to a term of "campaign 20," "SKU 134," or "Adobe Illustrator Draw App," within the additional natural-language input, the analytics system 102 identifies that term as the slot value corresponding to the missing slot.

Regardless of whether the analytics system 102 receives an indication of a selection or analyzes an additional natural-language input, the analytics system 102 determines a slot value for each slot corresponding to an analytics task before executing the analytics task. As suggested above, the analytics system 102 may customize multiple responses and analyze multiple natural-language inputs (or receive multiple indications of selected suggested slot values) before determining a slot value for each such slot. Having determined slot values for each of the analytics task's assigned slots, the analytics system 102 has the requisite information to execute an analytics task.

As shown in FIG. 2A, the analytics system 102 performs the act 230 of executing the analytics task. In general, the analytics system 102 uses the slot values corresponding to an analytics task to execute the analytics task. In some embodiments, the analytics system 102 uses the slot values as inputs into a function executed on an analytical dataset, such as an analytical dataset within the analytics database 110. In other words, the analytics system 102 executes the analytics task by executing the function with the slot values as inputs. Consistent with the disclosure above, the analytics system 102 may execute an analytics task to filter, label, query, segment, sort, surface, or otherwise analyze an analytical dataset. Such analyses represent merely a few examples of analytics tasks.

In some embodiments, the analytics system 102 sends an API call as part of executing the analytics task. For example, the analytics system 102 optionally sends an API call to an internal server or a third-party server requesting that the server execute a function using the determined slot values. The server then executes the function and returns the results to the analytics system 102.

Turning now to FIG. 2B, after executing the analytics task, the analytics system 102 performs the act 240 of sending a representation of the analytical dataset to the client device 114. The analytics system 102 sends a representation of the analytical dataset for display within the analytics interface. By sending this representation to the client device 114, the analytics system 102 provides the client device 102 with a visual representation of the analytics task's results. In other words, the representation of the analytical dataset communicates or depicts the results of the analytics task.

For example, in some embodiments, the analytics system 102 sends a representation of the analytical dataset depicting a segment of a certain customers, users, visitors, or some other target population according to demographic categories. As another example, the analytics system 102 sends a representation of the analytical dataset depicting the websites that visitors most commonly visited before navigating to a target website and purchasing a particular product. As yet another example, the analytics system 102 sends a representation of sales growth with respect to a particular product over the last year. Each of the foregoing examples represent a result of an analytics task. As explained below, FIGS. 3A and 3B include a representation of an analytical dataset within an analytics visualization interface.

As further shown in FIG. 2B, the analytics system 102 optionally performs the act 242 of identifying a suggested analytics task and the act 244 of customizing an advisory response. As indicated by the arrow corresponding to the act 244, the analytics system 102 also sends the customized advisory response to the client device 114 for presentation within the analytics interface. This customized advisory response references an analytics task as a suggested analytics task for the analytics system 102 to perform (e.g., a follow-up analytics task that compliments a previously executed analytics task requested by the user 118).

As suggested by their descriptions in FIGS. 2A and 2B, the acts 242 and 244 are respectively similar to the acts 204 and 206. Accordingly, the description and embodiments set forth above for the acts 204 and 206 respectively apply to the acts 242 and 244. In contrast to the acts 204 and 206, however, the acts 242 and 244 involve the analytics system 102 customizing an advisory response after receiving a natural-language or other input within a given session. In other words, the suggested analytics task for the act 242 may come closer in time to a previously executed analytics task and without the user 118 logging off or allowing a session to go inactive.

In addition to customizing an advisory response, the analytics system 102 optionally performs the act 246 of identifying a tutorial and the act 248 of customizing a recommendation that references the tutorial. As indicated by the arrow corresponding to the act 248, the analytics system 102 also sends the customized recommendation to the client device 114 for presentation within the analytics interface. The tutorial may comprise an article, video, or other medium explaining an analytics task.

For example, the tutorial may include an article or video that explains the slots and provides examples of slot values relevant to an analytics task. Alternatively, or additionally, the tutorial may include a video that highlights or demonstrates results for an analytics task within the analytics visualization interface. In some such embodiments, the analytics system 102 provides a tutorial using a video of an analytics task requested by a user similar to the user 118 (e.g., a user within a same organization or department).

In addition to identifying a tutorial and providing it as a recommendation, in some embodiments, the analytics system 102 identifies terms, functions, or options within the analytics interface to familiarize the user 118 with various analytics tasks and slot values. For example, the analytics system 102 optionally provides definitions of terms or a short description of an analytics task to the client device 114 for presentation within the chatbot interface. Additionally, or alternatively, the analytics system 102 optionally provides representations of sample datasets depicting the results of an analytics task to give the user 118 a preview of the type of results a particular analytics task may produce.

As further shown in FIG. 2B, in addition to customizing a recommendation referencing a tutorial, the analytics system 102 optionally performs the act 250 of re-executing the analytics task and the act 252 of customizing an update notification. As indicated by the arrow corresponding to the act 252, the analytics system 102 also sends the update notification to the client device 114 for presentation within the analytics interface. The update notification provides an update to the user 118 concerning the results (or rather updated results) of an analytics task. In some such embodiments, the update notification references an additional dataset that the analytics system 102 used to execute the analytics task.

The analytics system 102 re-executes the analytics task in a variety of circumstances. For example, in some embodiments, the analytics system 104 receives an indication of a selection from the client device 114 to re-execute the analytics task after a given time period (e.g., in three days, two weeks) or on a recurring schedule (e.g., every week, month, three months). Alternatively, in some embodiments, the analytics system 102 determines that the analytical dataset that the analytics system 104 initially used to execute the analytics task has changed. The analytical dataset may change, for example, by growing significantly larger or smaller or by reaching a statistically significant sample size (e.g., based on an estimation of a proportion, estimation of a mean, Mead's resource equation). In some such embodiments, the analytics system 102 re-executes the analytics task and sends a customized update notification only when the results of the analytics task have changed to reach a statistically significant result.

As noted above, the analytics system 102 provides an analytics interface to facilitate an exchange of a user's inputs and the analytics system 102's responses. In some embodiments, the analytics interface includes an analytics visualization interface and a chatbot interface. FIGS. 3A and 3B generally illustrate the client device 114 presenting an analytics interface 302 within a screen 300 comprising both an analytics visualization interface 304 and a chatbot interface 306. As shown, the client device 114 presents graphical representations within the analytics visualization interface 304. By contrast, the client device 114 presents an exchange of inputs and responses between the user 118 and the analytics system 102 within the chatbot interface 306.

As suggested above, the analytics application 116 comprises computer-executable instructions that cause the client device 114 to perform certain actions depicted in FIGS. 3A-3B. Rather than repeatedly describe the computer-executable instructions within the analytics application 116 as causing the client device 114 to perform such actions, this disclosure primarily describes the client device 114 as simply performing actions as a shorthand for that relationship. Additionally, while this disclosure refers to mouse clicks and keyboard inputs as examples of user interactions indicated by FIGS. 3A-3B, in additional or alternative embodiments, the client device 114 detects any suitable user interaction, including, but not limited to, an audio input into a microphone, a touch gesture on a touch screen, or a stylus interaction with a touch screen.

Turning back now to FIG. 3A, this figure illustrates the client device 114 presenting responses 316a-316d and natural-language inputs 318a-318b within the chatbot interface 306. As suggested by FIG. 3A, when the client device 114 receives the user 118's credential information to log in to the analytics system 102, the client device 114 sends the credential information to the analytics system 102 and receives data encoding the analytics interface 302. After the user 118 logs in, the analytics system 102 customizes the response 316a requesting input from the user 118. The client device 114 in turn presents the response 316a within the chatbot interface 306. The chatbot interface 306 further includes an input field 320 within which the client device 114 presents the user 118's natural-language or other inputs.

The exchange of natural-language inputs and responses that follow trigger the analytics system 102 to execute an analytics task. When the client device 114 detects the natural-language input 318a through a keyboard, the client device 114 both sends the natural-language input 318a to the analytics system 102 and presents the natural-language input 318a within the chatbot interface 306. Consistent with the disclosure above, the analytics system 102 subsequently determines that an intent of the natural-language input 318a corresponds to an analytics task for the analytics system 102 to execute.

As shown in FIG. 3A, the natural-language input 318a corresponds to an analytics task for determining the effectiveness of an advertising campaign. Accordingly, the analytics system 102 assigns a corresponding intent tag to the natural-language input 318a (e.g., "get_campaign_effectiveness"). The analytics system 102 then proceeds to identify slots for the analytics task, map slot values to the identified slots, and determine any missing slot values based on the natural-language input 318a.

In the embodiment depicted in FIG. 3A, the analytics system 102 determines that the natural-language input 318a does not include a slot value corresponding to a slot for a time period (i.e., a missing slot for time period). Instead of immediately customizing a response to request a slot value (or to suggest a slot value) corresponding to the missing slot, the analytics system 102 uses a presumptive slot value to execute the analytics task (e.g., a slot value of one week). The analytics system 102 then customizes the response 316b to summarize the results of the analytics task. Upon receiving the response 316b from the analytics system 102, the client device 114 presents the response 316b within the chatbot interface 306. Accordingly, FIG. 3A demonstrates that, in some embodiments, the analytics system 102 executes an analytics task based on both a natural-language input and presumptive slot values.

Having determined a missing slot, however, the analytics system 102 also customizes the response 316c to request a slot value corresponding to the missing slot. As shown in FIG. 3A, the response 316c inquires whether the user 118a is interested in a particular time period. The analytics system 102 sends the response 316c to the client device 114, which in turn presents the response 316c within the chatbot interface 306.

After presenting the response 316c, the client device 114 detects an additional input from the user 118. As indicated by FIG. 3A, the client device 114 detects the natural-language input 318b through a keyboard, sends the natural-language input 318b to the analytics system 102, and presents the natural-language input 318b within the chatbot interface 306. Based on the natural-language input 318b, the analytics system 102 determines a slot value corresponding to the missing slot. Here, the natural-language input 318b indicates a different slot value for the missing slot than the presumptive slot value for the missing slot.

As further indicated by FIG. 3A, the analytics system 102 executes the analytics task using an analytical dataset stored on the analytics database 110 and slot values for each of the identified slots for the analytics task. As shown, the analytics system 102 uses the analytical dataset to determine a certain number of visits to a website based on an advertising campaign. The analytics system 102 also customizes the response 316d to summarize the results of the analytics task with the updated time period. As indicated in FIG. 3A, the analytics system 102 further sends the response 316d to the client device 114 for presentation within the chatbot interface 306.

In addition to summarizing the results of the analytics task, the analytics system 102 also generates and sends a representation of the analytical dataset to the client device 114. This representation depicts the results of the analytics task. As shown in FIG. 3A, upon receiving the representation of the analytical dataset, the client device 114 presents a graphical representation 314a of the analytical dataset within the analytics visualization interface 304. As shown, the graphical representation 314a is a graph visually depicting the number of visits to a website. The graphical representation 314a is but one example of a representation that the analytics system 102 may generate.

As further shown in FIG. 3A, the analytics interface 302 further includes some additional analytics options to configure or adjust an analytics task. For example, the analytics interface 302 includes a search field 308, dimension menu options 310, and metric menu options 312. When the client device 114 detects an interaction between the user 118 and the search field 308, dimension menu options 310, or metric menu options 312, the client device 114 sends an indication of that interaction to the analytics system 102 to configure or adjust an analytics task. Accordingly, the natural-language inputs 318a and 318b are alternative inputs to the user interactions with analytics options within the analytics visualization interface 304, such as the search field 308, dimension menu options 310, and metric menu options 312.

Turning back now to FIG. 3B, this figure illustrates the client device 114 presenting responses 316e and 316f and input 318c within the chatbot interface 306. As suggested by the exchange within the chatbot interface 306, FIG. 3B depicts the analytics system 102 identifying suggested analytics tasks and customizing an advisory response. This advisory response includes a recommendation referencing the suggested analytics tasks.

Similar to the exchange depicted in FIG. 3A, in FIG. 3B, the analytics system 102 customizes the responses 316e and 316f after the user 118 logs in to the analytic system 102. Upon receipt of these responses, the client device 114 presents the response 316e as a welcome message and the response 316f as an advisory response recommending several suggested analytics tasks.

As suggested by FIG. 3B, the analytics system 102 identifies suggested analytics tasks for the user 118 initiation of a new session. In this particular embodiment, the analytics system 102 identifies suggested analytics tasks for detecting anomalies related to a website or software application. The analytics system 102 identifies these suggested analytics tasks in part because the user 118 has requested that the analytics system 102 execute an analytics task of monitoring the website or software application on a recurring schedule. As suggested by the response 316f, in some embodiments, the analytics system 102 executes each of the suggested analytics tasks and then customizes a response suggesting that the user 118 view the results of the suggested analytics tasks or that the user 118 request that the analytics system 102 execute the suggested analytics tasks.

As shown in FIG. 3B, the response 316f includes eight selectable options representing the suggested analytics tasks. When the client device 114 detects a selection by the user 118 of one of the selectable options, the client device 114 sends an indication of the user 118's selection to the analytics system 102. Upon receipt of the selection, the analytics system 102 executes the selected analytics task.

In addition to the selectable options, the chatbot interface 306 also includes the input field 320 within which the user 118 may enter natural-language inputs or other inputs that select one of the suggested analytics tasks. As shown in FIG. 3B, the client device 114 detects the input 318c from the user 118 through a keyboard and presents the input 318c within the chatbot interface 306. The input 318c includes a cue symbol indicating one of the suggested analytics tasks identified by the analytics system 102. The client device 114 further sends an indication of the input 318c to the analytics system 102. This indication of the input 318c triggers the analytics system 102 to execute one of its suggested analytics tasks.

After receiving the indication of the input 318c, the analytics system 102 executes the analytics task indicated within the input 318c. In this particular embodiment, the analytics system 102 detects anomalies for cart additions for a particular website or software application per the input 318c. Consistent with the disclosure above, the analytics system 102 also generates and sends a representation of an analytical dataset to the client device 114 that depicts the results of the analytics task. As shown in FIG. 3B, upon receiving the representation of the analytical dataset, the client device 114 presents a graphical representation 314b of the analytical dataset within the analytics visualization interface 304. The graphical representation 314a is a graph visually depicting statistics for cart-addition anomalies.

FIG. 3B depicts a particular method for identifying suggested analytics tasks based on the user 118's previously requested analytics tasks—and suggested analytics tasks for detecting anomalies—as examples. In additional embodiments, the analytics system 102 uses any of the methods described above to identify a suggested analytics task or suggests any of the analytics tasks described above. Additionally, although FIG. 3B depicts the analytics system 102 customizing and sending an advisory response after the user 118 logs in and initiates a new session, the analytics system 102 may customize and send an advisory response at any time during an exchange with the user 118.

Turning now to FIG. 4, this figure illustrates a schematic diagram of one embodiment of the analytics system 102. In some embodiments, one or more servers support the analytics system 102. Alternatively, in some embodiments, the client device 114 comprises the analytics system 102 or portions of the analytics system 102. For example, in some such embodiments, the client device 114 comprises the analytics application 116 to perform the functions described above by the analytics system 102.

As shown in FIG. 4, the analytics system 102 is communicatively coupled to the network 112. The analytics system 102 uses the network 112 to receive inputs from the client device 114 and send responses to the client device 114. Consistent with the disclosure above, the analytics system 102 includes, but is not limited to, the virtual analytics assistant 104, the analytics engine 108, and the analysis database 110. While FIG. 4 depicts the analytics system 102 as including the analytics database 110, in some embodiments, the analytics system 102 is coupled to and communicates with the analytics database 110 over the network 112. The following paragraphs describe the components of the virtual analytics assistant 104, the analytics engine 108, and the analysis database 110 in turn.

The virtual analytics assistant 104 includes various components that process and respond to various natural-language inputs. As shown, the virtual analytics assistant 104 includes a natural language processor 106, a context manager 404, a dialog planner 406, a natural-language generator 408, and a template-message manager 410. Consistent with the disclosure above, the natural language processor 106 applies natural-language processing to understand natural-language inputs. For example, the natural language processor 106 applies natural-language processing to determine an intent of natural-language inputs and optionally assign intent tags. Consistent with the disclosure above, the natural language processor 106 determines when a natural-language input's intent corresponds to an analytics task. In some embodiments, the natural language processor 106 assigns POS tags to terms within natural-language inputs as part of processing such inputs to determine their intent.

As noted above, the analytics system 102 optionally uses a third-party NLP application stored either locally or on a third-party server. Accordingly, as further shown in FIG. 4, the virtual analytics assistant 104 optionally includes a third-party NLP application 402. For example, the third-party NLP application 402 may comprise LUIS, Wit.ai, API.ai, or some other publicly available NLP application. In some such embodiments, the natural language processor 106 sends an API call to the third-party NLP application 402 requesting that the third-party NLP application 402 determine an intent of a natural-language input. In response, the third-party NLP application 402 determines intent, assigns intent tags, and optionally assigns POS tags as part of the process of understanding a natural-language input.

Regardless of whether the virtual analytics assistant 104 includes the third-party NLP application 402, the natural language processor 106 provides an indication of the intent to the dialog planner 406 (e.g., with an intent tag). In certain embodiments, the dialog planner 406 performs various slot-filling functions of the analytics system 102. For example, the dialog planner 406 identifies slots for an analytics task, maps slot values to the identified slots, determines any missing slot values, and identifies any suggested slot values. In short, the dialog planner 406 transforms an identification of intent into slot values that the analytics engine 108 uses to execute an analytics task.

As further shown in FIG. 4, the dialog planner 406 sends and receives contextual information to and from the context manager 404. The context manager 404 tracks and identifies the user 118's previous natural-language inputs and previously requested analytics tasks, including the intent tags for the user 118's previous natural-language inputs. Additionally, the context manager 404 communicates with the analytics database 110 to retrieve contextual information used for identifying a suggested analytics task.

Consistent with the disclosure above, the context manager 404 retrieves contextual information that the dialog planner 406 uses to identify a suggested slot value based on frequency, recent performance, similarity, ordered sequencing, or relatedness, as explained above. Such contextual information includes, but is not limited to, users' previously requested analytics tasks, ordered sequences of analytics tasks, rankings of previously executed analytics tasks, slots and slot values of previously executed analytics tasks, and common slots and slot values among analytics tasks.

As further shown in FIG. 4, the dialog planner 406 sends various slot information to the natural language generator 408. For example, the dialog planner 406 optionally sends data identifying missing slots, slot values, or suggested slot values to the natural-language generator 408. The natural-language generator 408 in turn customizes and generates natural-language responses. Consistent with the disclosure above, in some embodiments, the natural-language generator 408 receives pre-labeled training data and processes the training data to learn how to customize a response. Additionally, or alternatively, the natural-language generator 408 uses template messages, slots, and slot values to customize a natural-language response.

As indicated by FIG. 4, when the natural-language generator 408 uses template messages to customize natural-language responses, the natural-language generator 408 exchanges template information with the template-message manager 410. Consistent with the disclosure above, the template-message manager 410 identifies and provides template messages to the natural-language generator 408. For example, in some embodiments, the natural-language generator 408 provides the template-message manager 410 with the relevant slots or slot values upon which a customized response is based. The template-message manager 410 in turn identifies a template message based on the slots or slot values the natural-language generator 408 provides. In some such embodiments, the template-message manager 410 uses a template-message database that correlates slots or slot values, on the one hand, with template messages, on the other hand.

Turning back now to the analytics engine 108, as shown in FIG. 4, the analytics engine 108 uses information received from the dialog planner 406 to execute an analytics task. In particular, the dialog planner 406 sends indications of a natural-language input's intent (e.g., intent tag), an analytics task corresponding to the natural-language input, slots corresponding to the analytics task (e.g., slot tags), and/or slot values for the analytics task to the analytics engine 108.

The analytics engine 108 in turn uses the received indications of the natural-language input's intent (or of the analytics task) to determine which task engine to use to execute the analytics task. In some embodiments, a task engine comprises computer-executable instructions that, when executed by at least one processor, execute a particular analytics task or a group of analytics tasks. Upon determining which task engine to use, the analytics engine 108 uses the slot values for the analytics task to execute the analytics task.

The analytics engine 108 includes various task engines, including, but not limited to, task engines 422-430. As shown in FIG. 4, the analytics engine 108 includes a query engine 422, an alerts engine 424, a segmentation engine 426, an anomaly engine 428, and a sales-tracking engine 430. Each of the task engines 422-430 executes a different analytics task or a different group of analytics tasks. The following paragraphs generally describe each of the task engines 422-430.

The query engine 422 executes analytics tasks for querying the analytics database 110. For example, the query engine 422 may query the analytics database 110 to identify a particular tutorial, article, or slot value. Additionally, or alternatively, the query engine 422 may query the analytics database 110 to identify a particular order, user of the analytics system 102, or user of a third-party website or application.

The alerts engine 424 executes analytics tasks for configuring an alert. For example, the alerts engine 424 may configure an alert for the user 118 that notifies the client device 114 when an analytical dataset reaches a statistically significant size. Additionally, or alternatively, the alerts engine 424 may configure an alert for the user 118 that notifies the user 118 to perform another analytics task after a predetermined time period or on a recurring schedule.

The segmentation engine 426 executes analytics tasks that identify segments of users or actions performed by segments of users. For example, the segmentation engine 426 identifies segments of users within an analytical dataset that performed certain actions or satisfy a particular demographic. Relatedly, the segmentation engine 426 identifies certain actions performed or items consumed by a segment of users. In one such analytics task, the segmentation engine 426 identifies the websites or webpages that a visitor most commonly visited before navigating to a target website and purchasing a particular product.

The anomaly engine 428 detects anomalies within analytical datasets. As used in this disclosure, the term "anomaly" indicates an error in a software application, product, website, or some other item. As indicated by the embodiment depicted in FIG. 3B, among other things, the anomaly engine 428 may detect anomalies for cart additions, checkouts, or orders on a website.

Turning back now to FIG. 3, the sales-tracking engine 430 determines sales growth or sales decline or otherwise tracks sales for a particular organization, product, service, or some other quantifiable entity. For example, the sales-tracking engine 430 may analyze an analytical dataset to determine sales growth for an organization for a year to date. As another example, the sales-tracking engine 430 may analyze an analytical dataset to determine sales growth of a product for the lifetime of the product (e.g., ten or fifteen years).

As further shown in FIG. 4, in some embodiments, the virtual analytics assistant 104 and the analytics engine 108 access and communicate with the analytics database 110. As noted above, the context manager 406 accesses the analytics database to retrieve contextual information used for identifying a suggested analytics task. Additionally, the analytics engine 108 uses analytical datasets stored on the analytics database 110 to execute analytics tasks.

To facilitate retrieving contextual information and executing analytics tasks, the analytics database 110 maintains various analytical datasets. Those analytical datasets include, but are not limited to, analytics-task data 412, application data 414, profile data 416, sales data 418, and website data 420. In one or more embodiments, the analytics-task data 412 comprises analytical datasets for previously requested and previously executed analytics tasks for users of the analytics system 102. By contrast, the application data 414 includes analytical datasets for how a particular software application has been used, including, but not limited, to login information, videos users viewed using the software application, purchases made using the software application, and various other actions performed by the software application.

The profile data 416 includes analytical datasets of profile information for users of the analytics system 102. Additionally, or alternatively, the profile data 416 includes analytical datasets of profile information for users of a particular service, software application, or website. Regardless of the type of users to whom the profile data 416 pertains, in some embodiments, the profile information includes information concerning a user's organization, demographics, job title, contact information, and/or location.

As further shown in FIG. 4, the sales data 418 includes analytical datasets for sales information. In one or more embodiments, the sales data 418 organizes sales by application, organization, product, service, website, or other metric. Additionally, or alternatively, the sales data 418 includes information organized by or correlated with profile information. By contrast, the website data 420 includes analytical datasets for websites. The website data 420 includes, but is not limited to, data tracking conversions, purchases, visits, or views according to website or webpage within a website.

Figure 5:
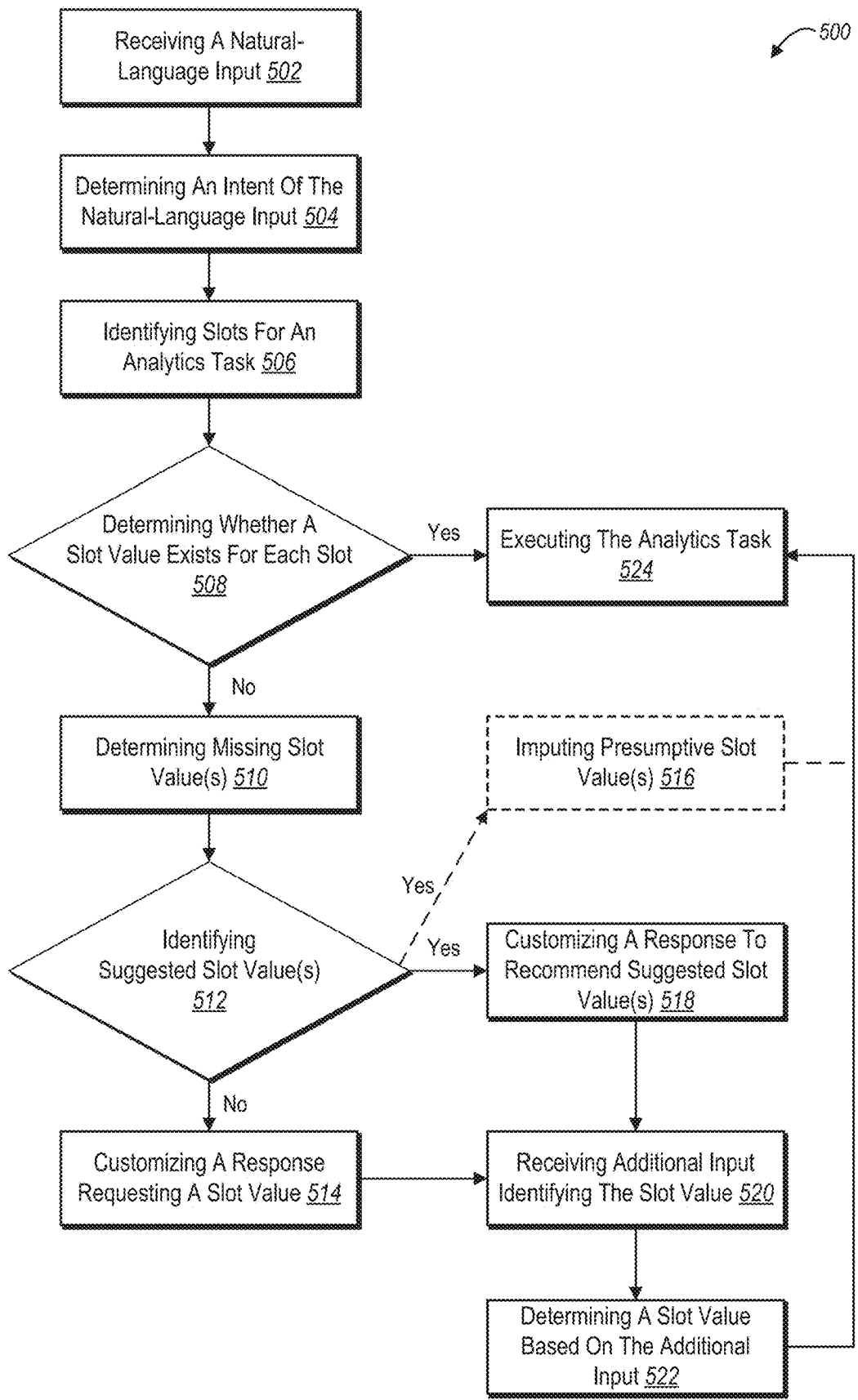
FIG. 5 illustrates a sequence-flow diagram of the analytics system of FIG. 1 in accordance with one or more embodiments.

Turning now to FIG. 5, this figure illustrates a sequence-flow diagram 500 of the analytics system 102 determining a slot value for each slot relevant to an analytics task based on user inputs. The sequence-flow diagram 500 includes a series of acts 502-524 that the analytics system 102 performs to process natural-language inputs and execute an analytics task. The acts 502-524 correspond to acts performed by certain embodiments of the analytics system 102 described above.

As shown in FIG. 5, the analytics system 102 performs the act 502 of receiving a natural-language input. When performing the act 502, in some embodiments, the analytics system 102 receives audio of a spoken request indicating an analytics task. Alternatively, the analytics system 102 receives a textual request indicating an analytics task. As explained above with reference to the act 208 in FIG. 2A, the analytics system 102 receives the natural-language input from the client device 114.

After receiving the natural-language input, the analytics system 102 performs the act 504 of determining an intent of the natural-language input. This disclosure describes the act 504 above with reference to the act 210 of FIG. 2A. When performing the act 504, the analytics system 102 determines that an intent of the natural-language input corresponds to an analytics task for the analytics system 102 to execute. As described above, the analytics system 102 optionally applies natural-language-processing techniques to the natural-language input to assign an intent tag representing the intent of the natural-language input (e.g., by using an NLP application or training a classifier).

As noted above, in certain embodiments, the analytics system 102 generates a customized response based on a slot from multiple slots that analytics system 102 uses when executing an analytics task. As described below, in certain embodiments, the analytics system 102 performs the acts 508-518 as part of generating the customized response. Indeed, in some embodiments, the analytics system 102 performs a method that includes a step for generating a customized response based on a slot from multiple slots that the analytics system 102 uses when executing the analytics task. The acts 508-518 correspond to the step for generating a customized response.

After determining an intent of the natural-language input, the analytics system 102 performs the act 506 of identifying slots for an analytics task. This disclosure describes the act 506 above with reference to the act 212 of FIG. 2A. When performing the act 506, the analytics system 102 maps an identified analytics task to slots the analytics system 102 previously assigned to the analytics task (e.g., from a programmer or preassigned slots within the analytics engine 108 or analytics database 110).

Having identifies slots for the analytics task, the analytics system 102 performs the act 508 of determining whether a slot value exists for each slot. As noted above, the analytics system 102 does not execute an analytics task until it has identified slot values (or supplied suggested slot values) for each slot corresponding to an analytics task. To determine whether a slot value exists for each slot, the analytics system 102 maps slot values to slots. When doing so, the analytics system 102 identifies slot values from within natural-language inputs or other inputs. As explained above, in certain embodiments, the analytics system 102 assigns each term within a natural-language input a slot tag and then identifies the term corresponding to certain slot tags as a slot value.

As indicated by the sequence-flow diagram 500, the analytics system 102 performs different actions depending on whether a slot value exists for each slot corresponding to an analytics task. If the analytics system 102 determines a slot value for each slot, then the analytics system 102 executes the analytics task using an analytical dataset and slot values for each slot corresponding to the analytics task. In other words, the analytics system 102 performs the act 524 of executing the analytics task.

By contrast, if the analytics system 102 does not determine a slot value for each slot, the analytics system 102 determines any missing slot value(s). In other words, the analytics system 102 performs the act 510 of determining missing slot value(s). This disclosure describes the act 510 above with reference to the act 216 of FIG. 2A. In general, when performing the act 510, the analytics system 102 determines whether a natural-language input includes one or more slot values for the analytics task. In certain embodiments, the analytics system 102 determines whether it has assigned each slot corresponding to an identified analytics task to terms within one or more natural-language inputs. When the analytics system 102 has not assigned a particular slot to a term within a natural-language input, the analytics system 102 likewise determines that the natural-language input is missing a slot value for the analytics system.

As further shown in FIG. 5, after determining missing slot value(s), the analytics system 102 performs the act 512 of identifying suggested slot value(s). This disclosure describes the act 512 above with reference to the act 218 in FIG. 2A. As described above, the analytics system 102 optionally identifies suggested slot value(s) based on frequency, recent performance, similarity, ordered sequencing, or relatedness of analytics tasks.

As indicated by the sequence-flow diagram 500, the analytics system 102 performs different actions depending on whether it identifies suggested slot values. If the analytics system identifies suggested slot value(s) the analytics system 102 performs the act 518 of customizing a response to recommend suggested slot value(s). By contrast, if the analytics system does not identify suggested slot value(s), the analytics system 102 performs the act 514 of customizing a response requesting a slot value.

This disclosure describes the acts 514 and 518 above with reference to the act 220 in FIG. 2A. As their descriptions imply, however, the act 514 corresponds to the embodiments in which the analytics system 102 customizes a response to recommend one or more suggested slot values corresponding to a missing slot value. Conversely, the act 518 corresponds to the embodiments in which the analytics system 102 customizes a response to request one or more slot values corresponding to missing slot value(s).

Regardless of the type of customized response, the analytics system 102 receives a reply to the customized response. As further shown in FIG. 5, the analytics system 102 performs the act 520 of receiving additional input identifying the slot value and the act 522 of determining a slot value based on the additional input. When receiving the additional input, the analytics system 102 in effect receives an input based upon which the analytics system 102 determines one or more of the missing slot values. This disclosure describes the acts 520 and 522 above with reference to the acts 222 and 228 in FIG. 2A, respectively.

As further shown in FIG. 5, in some embodiments, if the analytics system 102 identifies suggested slot value(s), the analytics system 102 performs the optional act of inputting presumptive slot value(s). As described above with reference to FIG. 3A, the analytics system 102 uses one or more of the suggested slot values as presumptive slot values to executed the analytics task. In other words, in some embodiments, the analytics system 102 inputs presumptive slot values for the user 118 to execute an analytics task. Consistent with the disclosure above, the analytic system 102 may further customize a response that either requests a slot value or recommends a suggested slot value.

After determining a slot value based on an additional input or inputting presumptive slot value(s), the analytics system 102 performs the act 524 of executing the analytics task. This disclosure describes the acts 524 above with reference to the act 230 in FIG. 2A. Alternatively, or additionally, in some embodiments, the analytics system 102 uses one of the task engines 422-430 to execute the analytics task.

Figure 6:
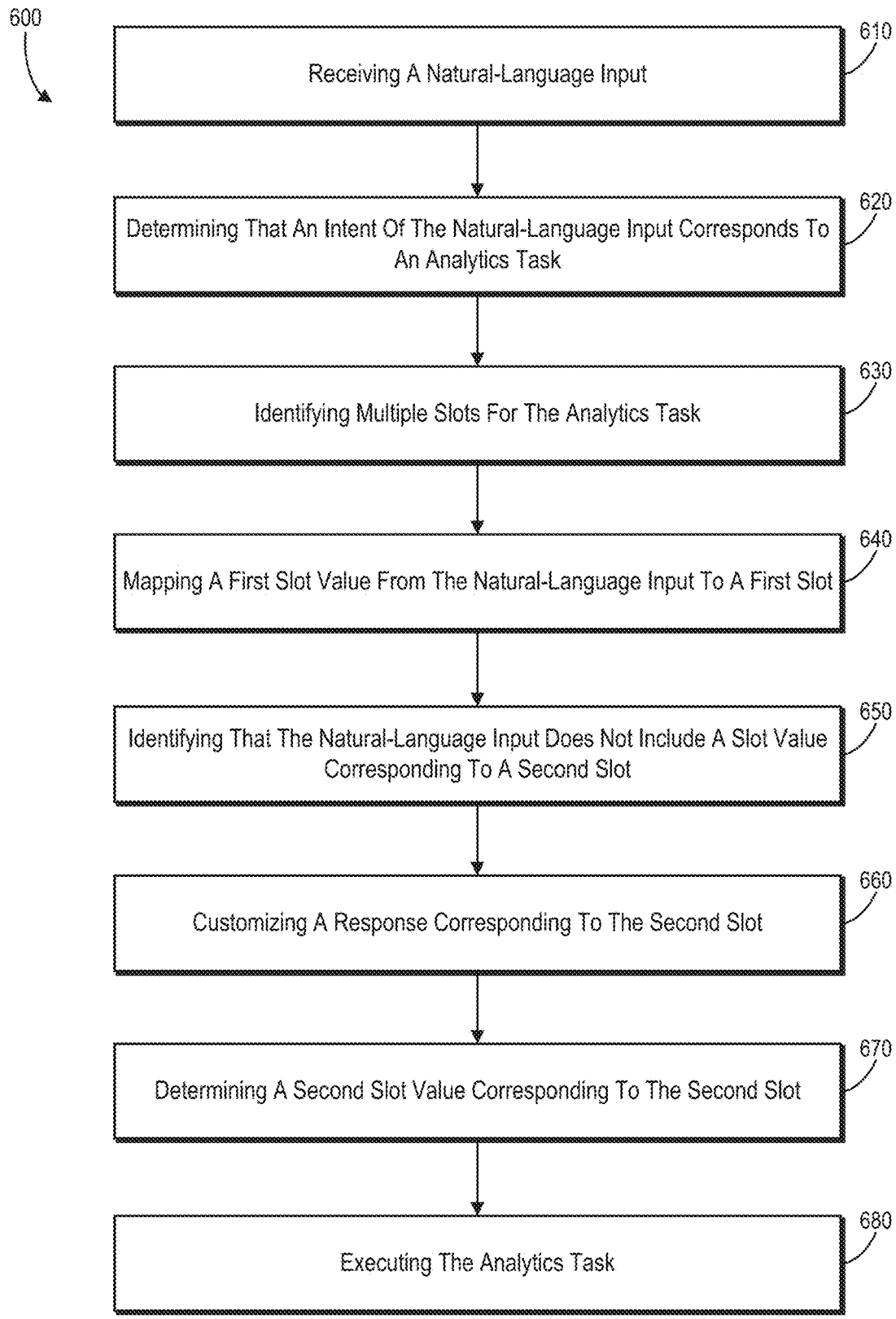
FIG. 6 illustrates a flowchart of a series of acts in a method of executing an analytics task based on natural-language inputs in accordance with one or more embodiments.

Turning now to FIG. 6, this figure illustrates a flowchart of a series of acts 600 in a method of executing an analytics task based on natural-language inputs in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable storage medium can comprise instructions that, when executed by one or more processors, cause a computing device to perform the acts depicted in FIG. 6. In still further embodiments, a system can perform the acts of FIG. 6.

As shown in FIG. 6, the acts 600 include an act 610 of receiving a natural-language input. In particular, in some embodiments, the act 610 includes receiving, from a client device, a natural-language input that a user provides via an analytics interface. For example, in some embodiments, receiving the natural-language input comprises receiving audio of a spoken request indicating the analytics task or receiving a textual request indicating the analytics task.

In some embodiments, the analytics interface comprises a chatbot interface and an analytics visualization interface. Accordingly, in certain embodiments, receiving the natural-language input that the user provides via the analytics interface comprises receiving the natural-language input that the user provides via the chatbot interface.

As further shown in FIG. 6, the acts 600 include an act 620 of determining that an intent of the natural-language input corresponds to an analytics task. In particular, in some embodiments, the act 620 includes determining that an intent of the natural-language input corresponds to an analytics task for the analytics system to execute. For example, in certain embodiments, determining that the intent of the natural-language input corresponds to the analytics task for the analytics system to execute comprises applying natural language processing to assign to the natural-language input an intent tag representing the analytics task.

As further shown in FIG. 6, the acts 600 include an act 630 of identifying multiple slots for the analytics task. For example, in some embodiments, identifying multiple slots for the analytics task comprises identifying slot tags representing the multiple slots for the analytics task.

As further shown in FIG. 6, the acts 600 include an act 640 of mapping a first slot value from the natural-language input to a first slot. In particular, in some embodiments, the act 640 includes mapping a first slot value from the natural-language input to a first slot from the multiple slots.

As further shown in FIG. 6, the acts 600 include an act 650 of identifying that the natural-language input does not include a slot value corresponding to a second slot. In particular, in some embodiments, the act 650 includes identifying that the natural-language input does not include a slot value corresponding to a second slot from the multiple slots.

As further shown in FIG. 6, the acts 600 include an act 660 of customizing a response corresponding to the second slot. In particular, in some embodiments, the act 660 includes customizing a response corresponding to the second slot from the multiple slots.

For example, in some embodiments, customizing the response corresponding to the second slot comprises customizing the response to request the second slot value corresponding to the second slot. By contrast, in some embodiments, customizing the response corresponding to the second slot comprises identifying a suggested slot value corresponding to the second slot and customizing the response to recommend the suggested slot value corresponding to the second slot.

As noted above, in some embodiments, the analytics interface comprises a chatbot interface and an analytics visualization interface. In certain embodiments, customizing the response corresponding to the second slot comprises customizing the response for display within the chatbot interface.

As further shown in FIG. 6, the acts 600 include an act 670 of determining a second slot value corresponding to the second slot. In particular, in some embodiments, the act 670 includes, based on an additional input received from the client device in reply to the customized response, determining a second slot value corresponding to the second slot.

As further shown in FIG. 6, the acts 600 include an act 680 of executing the analytics task. In particular, in some embodiments, the act 680 includes, in response to determining slot values for each of the multiple slots, executing the analytics task using an analytical dataset and the slot values for each of the multiple slots.

In addition to the acts 610-680, in some embodiments, the acts 600 further include receiving the additional input from the client device, the additional input comprising an additional natural-language input. Relatedly, in some embodiments, the acts 600 further include receiving the additional input from the client device, the additional input identifying the second slot value corresponding to the second slot. Similarly, in certain embodiments, the acts 600 further include receiving the additional input from the client device, the additional input comprising an additional natural-language input identifying the second slot value corresponding to the second slot.

As noted above, in some embodiments, the analytics interface comprises a chatbot interface and an analytics visualization interface. In certain embodiments, the acts 600 further include receiving, from the client device, the additional input that the user provides via the chatbot interface. By contrast, in one or more embodiments, the acts 600 further include sending a representation of the analytical dataset to the client device for display within the analytics visualization interface.

Additionally, in some embodiments, the acts 600 further include sending a representation of the analytical dataset to the client device for display within a graphical user interface. Moreover, in certain embodiments, the acts 600 further include identifying a suggested analytics task related to the analytics task and customizing an advisory response including a recommendation referencing the suggested analytics task. Relatedly, in some embodiments, identifying the suggested analytics task related to the analytics task comprises identifying the suggested analytics task based on one or more users' previously requested analytics tasks. By contrast, in certain embodiments, the acts 600 further include, before receiving the natural-language input, identifying the analytics task and customizing an advisory response referencing the analytics task as a suggested analytics task for the analytics system to perform.

As suggested above, in some embodiments, the analytics system 102 receives inputs with incompatible slot values. Accordingly, in certain embodiments, the acts 600 further include receiving, from the client device, the additional input including an incompatible slot value that does not correspond to the second slot and customizing an additional response that describes the second slot and requests an additional slot value that corresponds to the second slot. Relatedly, in one or more embodiments, the acts 600 further include receiving a further input identifying the second slot value corresponding to the second slot.

Additionally, in certain embodiments, the acts 600 further include identifying a tutorial related to the analytics task and customizing a recommendation that references the tutorial. Finally, in one or more embodiments, the acts 600 further include re-executing the analytics task using an additional analytical dataset and customizing an update notification that references the additional analytical dataset.

In addition to the methods described above, in some embodiments, the method 600 includes a step for generating a customized response based on a slot from multiple slots. For example, in some such embodiments, the method 600 includes a step for generating a customized response based on a slot from multiple slots that the analytics system uses when executing the analytics task. The acts 508-518 of FIG. 5 represent acts that correspond to the step for generating a customized response. Accordingly, the description and embodiments set forth above for the acts 508-518 correspond to the step for generating a customized response.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 7:
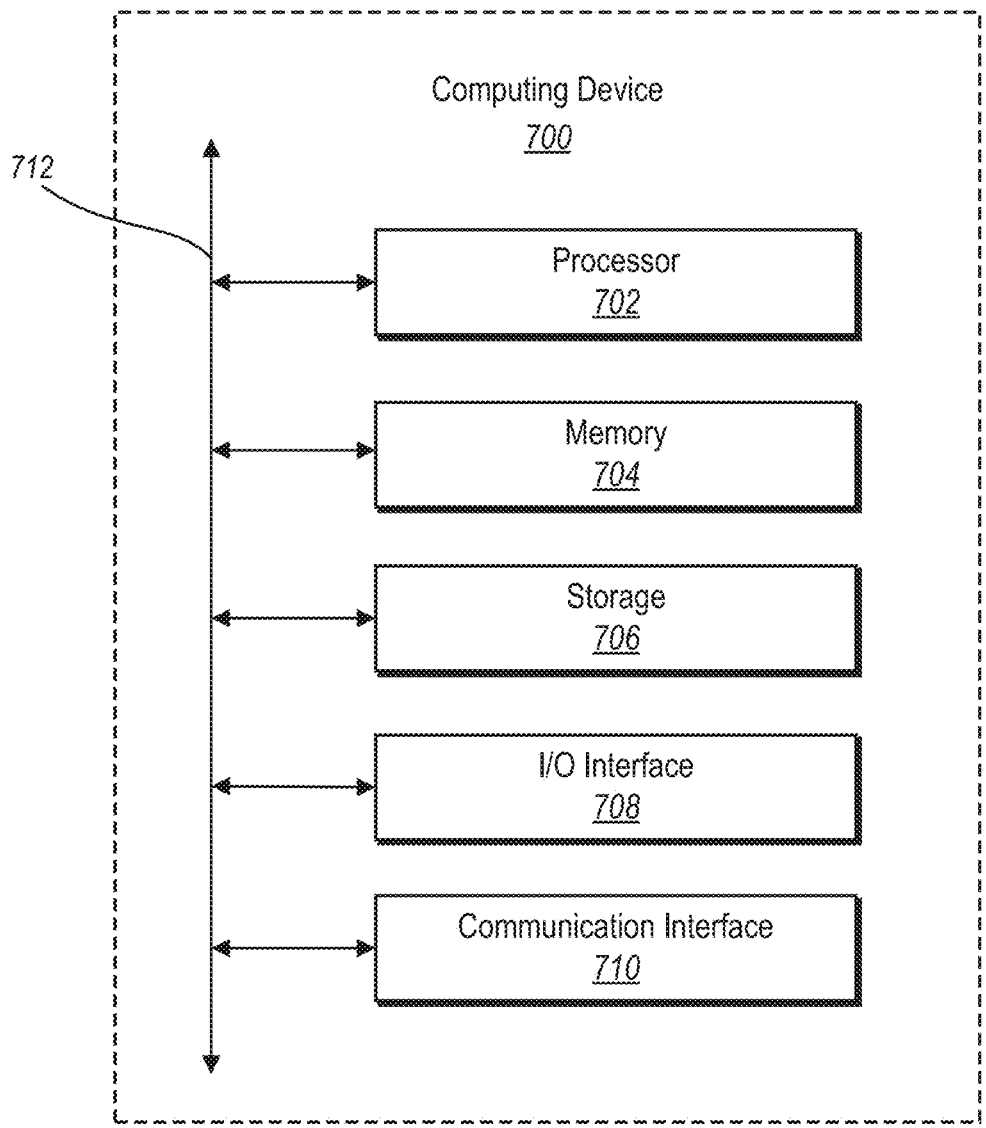
FIG. 7 illustrates a block diagram of an exemplary computing device in accordance with one or more embodiments.

FIG. 7 illustrates a block diagram of exemplary computing device 700 that may be configured to perform one or more of the processes described above. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for digitizing real-world objects, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions related to object digitizing processes (e.g., digital scans, digital models).

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
    receiving, from a client device, a natural-language input that a user provides via an analytics interface;
    determining that an intent of the natural-language input corresponds to an analytics task for an analytics system to execute based on an analytical dataset;
    determining, from the natural-language input, slot values corresponding to multiple slots associated with the analytics task;
    executing the analytics task using the analytical dataset and the slot values corresponding to the multiple slots determined from the natural-language input; and
    providing, for display within the analytics interface, a representation of results from the analytics task.

2. The method as recited in claim 1, wherein determining that the intent of the natural-language input corresponds to the analytics task for the analytics system to execute comprises processing the natural-language input using a neural network.

3. The method as recited in claim 1, wherein determining that the intent of the natural-language input corresponds to the analytics task for the analytics system to execute comprises mapping the natural-language input to an intent tag associated with the analytics task.

4. The method as recited in claim 1, wherein determining the slot values corresponding to multiple slots associated with the analytics task comprises:
    mapping slot tags to terms of the natural-language input to identify the slot values; and
    mapping the slot values determined from the natural-language input to the multiple slots associated with the analytics task based on the slot tags.

5. The method as recited in claim 1, further comprising:
    determining that a slot associated with the analytics task is missing a slot value; and
    customizing a response to the natural-language input that requests one or more slot values corresponding to the slot missing a slot value.

6. The method as recited in claim 5, further comprising:
    receiving an additional natural language input reply to the customized response;
    determining a new slot value corresponding to the slot missing a slot value;
    execute an updated analytics task using the analytical dataset and the new slot value; and
    provide, for display within the analytics interface, a representation results from the updated analytics task.

7. A non-transitory computer readable storage medium comprising instructions that, when executed by at least one processor, cause a computing device to:
    receive a natural-language input that a user provides via an analytics interface;
    determine that an intent of the natural-language input corresponds to an analytics task for an analytics system to execute based on an analytical dataset;
    determine, from the natural-language input, slot values corresponding to multiple slots associated with the analytics task;
    execute the analytics task using the analytical dataset and the slot values corresponding to the multiple slots determined from the natural-language input; and
    provide, for display within the analytics interface, a representation of results from the analytics task.

8. The non-transitory computer readable storage medium of claim 7, further comprising instructions that, when executed by the at least one processor, cause the computing device to:
    determine that a slot associated with the analytics task is missing a slot value; and
    customize a response to the natural-language input that requests one or more slot values corresponding to the slot missing a slot value.

9. The non-transitory computer readable storage medium of claim 8, further comprising instructions that, when executed by the at least one processor, cause the computing device to customize the response by:
    identifying a suggested slot value corresponding to the slot missing a slot value; and
    customizing the response to recommend the suggested slot value corresponding to the slot.

10. The non-transitory computer readable storage medium of claim 8, further comprising instructions that, when executed by the at least one processor, cause the computing device to:
    identify a suggested analytics task; and
    customize the response by customizing an advisory response including a recommendation referencing the suggested analytics task.

11. The non-transitory computer readable storage medium of claim 10, further comprising instructions that, when executed by the at least one processor, cause the computing device to identify the suggested analytics task by identifying the suggested analytics task based on one or more users' previously requested analytics tasks.

12. The non-transitory computer readable storage medium of claim 8, further comprising instructions that, when executed by the at least one processor, cause the computing device to determine that the intent of the natural-language input corresponds to the analytics task utilizing a support vector machine.

13. A system comprising:
    a non-transitory computer memory comprising analytical datasets; and
    at least one server that is configured to cause the system to:
    provide an analytics interface;
    receive a selection of an analytical dataset from the analytical datasets;
    analyze the selected analytical dataset and determine a suggested analytics task;
    provide an indication of the suggested analytics task in a chatbot interface within the analytics interface;

receive, from a client device, a natural-language input in response to the indication of the suggested analytics task;

determine, from the natural-language input, slot values corresponding to multiple slots associated with the suggested analytics task;

execute the suggested analytics task using the selected analytical dataset and the slot values corresponding to the multiple slots determined from the natural-language input; and provide, for display within the analytics interface, a representation of results from the suggested analytics task.

14. The system of claim 13, wherein the at least one server is further configured to cause the system to determine the suggested analytics task by identifying a recently performed analytics task and identifying an analytics task related to the recently performed analytics task as the suggested analytics task.

15. The system of claim 13, wherein the at least one server is further configured to cause the system to determine the suggested analytics task by identifying a frequently performed analytics task.

16. The system of claim 14, wherein the at least one server is further configured to cause the system to:

determine one or more suggested metrics on which to base the suggested analytics task; and provide the one or more suggested metrics in connection with the suggested analytics task.

17. The system of claim 16, wherein the at least one server is further configured to cause the system to identify one of the one or more suggested metrics based on the natural-language input.

18. The system of claim 13, wherein the at least one server is further configured to cause the system to:

receive, from the client device, an additional input including an incompatible slot value that does not correspond to a slot from the multiple slots; and customize an additional response that describes the slot from the multiple slots and requests an additional slot value that corresponds to the slot from the multiple slots.

19. The system of claim 13, wherein the at least one server is further configured to cause the system to generate the results from the analytics task by identifying a segment of users or visitors meeting one or more metrics specified based on the slot values.

20. The system of claim 13, wherein the at least one server is further configured to cause the system to:

identify a tutorial related to the suggested analytics task; and customize a recommendation that references the tutorial.

* * * * *